United States Patent [19]
Hirakawa

[11] Patent Number: 5,572,276
[45] Date of Patent: Nov. 5, 1996

[54] INNER FOCUS TYPE TELEPHOTO ZOOM LENS

[75] Inventor: Jun Hirakawa, Tokyo, Japan

[73] Assignee: Asahi Kogaku Kogyo Kabushiki Kaisha, Tokyo, Japan

[21] Appl. No.: 339,186

[22] Filed: Nov. 10, 1994

[30] Foreign Application Priority Data

Nov. 12, 1993 [JP] Japan .................................. 5-283617

[51] Int. Cl.⁶ .................................................. G02B 15/14
[52] U.S. Cl. ........................... 359/684; 359/686; 359/691
[58] Field of Search ................................ 359/684, 686, 359/691

[56] References Cited

U.S. PATENT DOCUMENTS

| | | | |
|---|---|---|---|
| 3,594,066 | 7/1971 | Cook et al. | 359/684 |
| 4,395,092 | 7/1983 | Itoh | 359/676 |
| 4,752,121 | 6/1988 | Kitagishi | 359/676 |
| 5,059,007 | 10/1991 | Tanaka | 359/676 |
| 5,272,564 | 12/1993 | Suzuki et al. | 359/676 |
| 5,325,234 | 6/1994 | Yoneyama | 359/684 |
| 5,416,639 | 5/1995 | Yamanashi | 359/686 |
| 5,448,412 | 9/1995 | Maruyama | 359/684 |

*Primary Examiner*—Georgia Y. Epps
*Assistant Examiner*—Evelyn A. Lester
*Attorney, Agent, or Firm*—Greenblum & Bernstein P.L.C.

[57] ABSTRACT

An inner focus type telephoto zoom lens which includes a first lens group having a positive power, and a rear lens group of a variable power having a plurality of lens groups, located in this order from an object side. The first lens group includes a first sub-group of lenses which is not moved for focusing, and a second sub-group of movable positive lenses that are moved along an optical axis to for focusing.

14 Claims, 15 Drawing Sheets

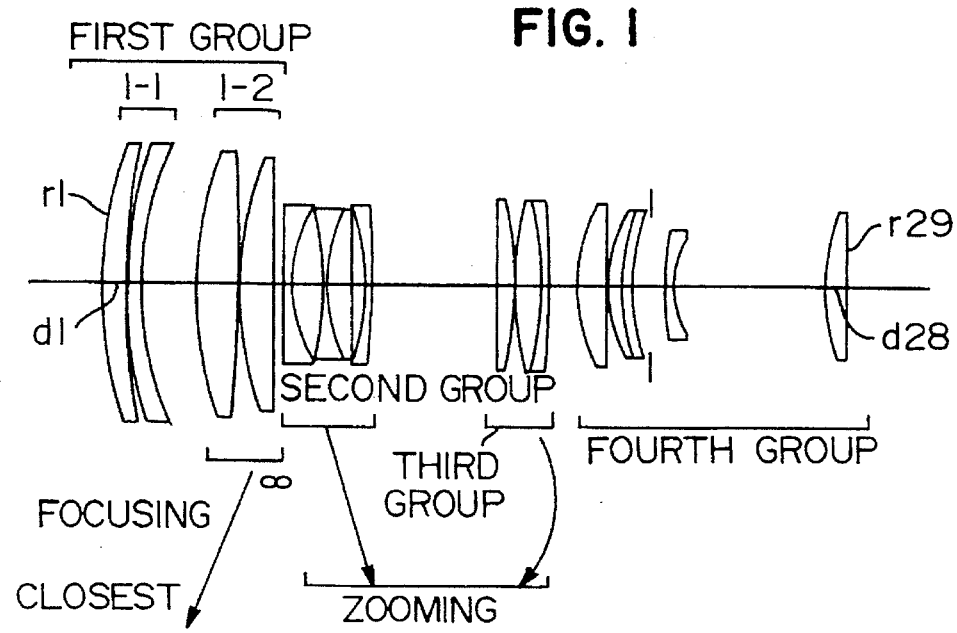
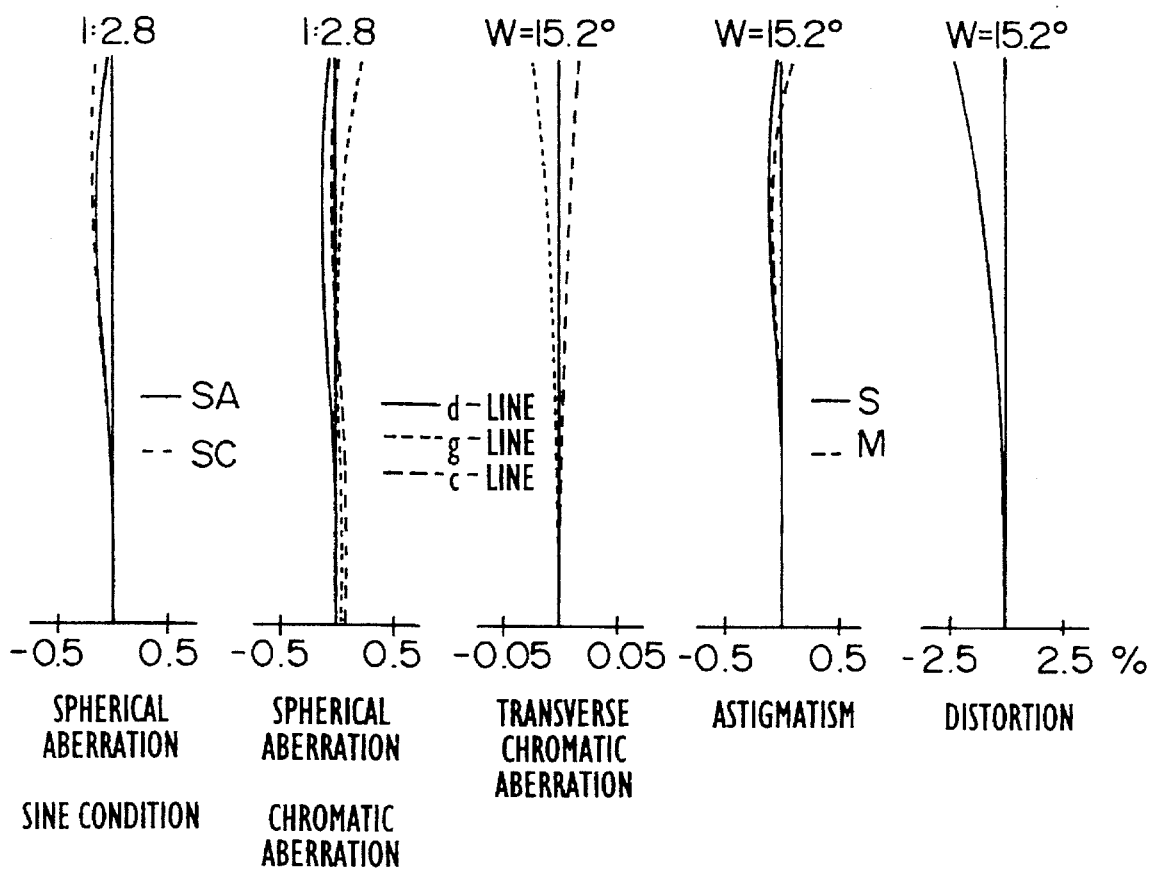

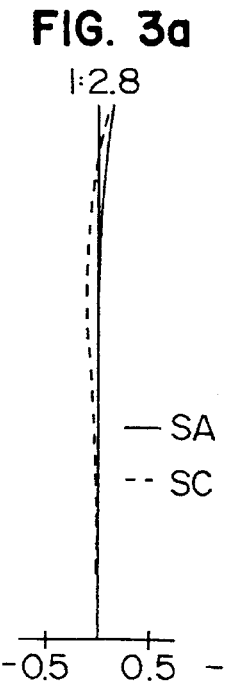
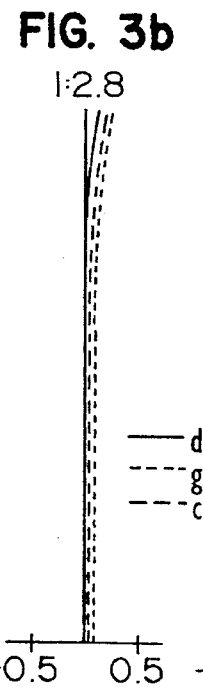
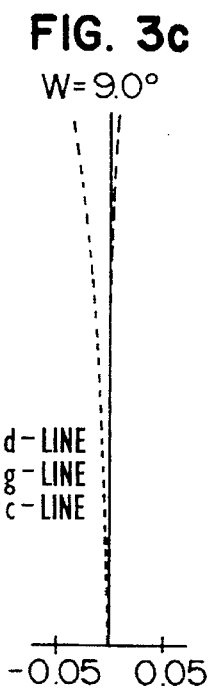
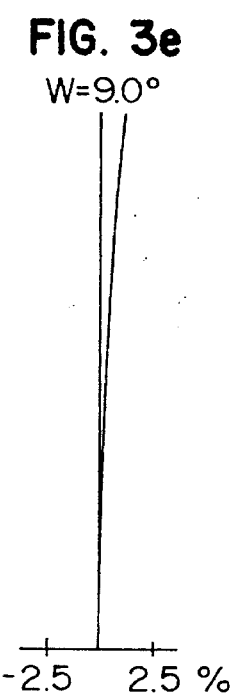
FIG. 3a — SPHERICAL ABERRATION / SINE CONDITION
FIG. 3b — SPHERICAL ABERRATION / CHROMATIC ABERRATION
FIG. 3c — TRANSVERSE CHROMATIC ABERRATION
FIG. 3d — ASTIGMATISM
FIG. 3e — DISTORTION
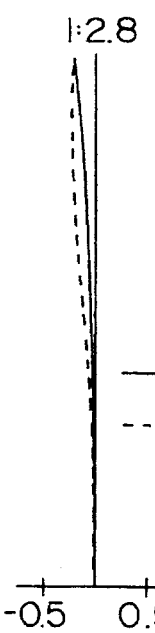
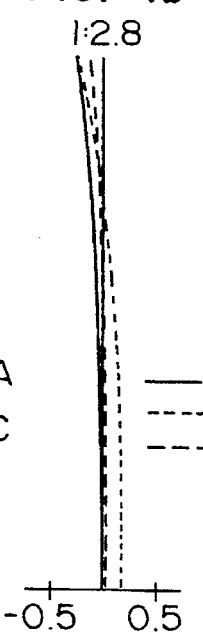
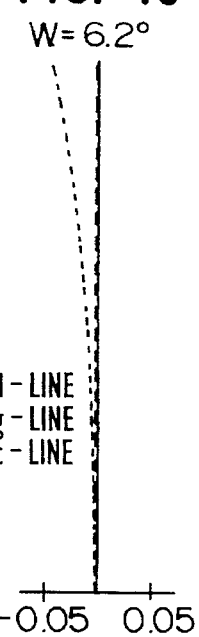
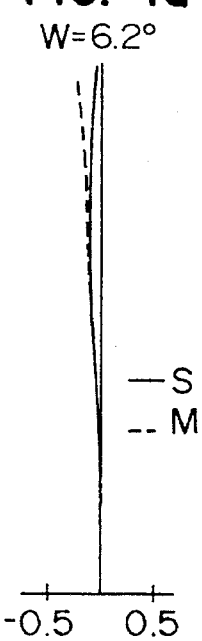
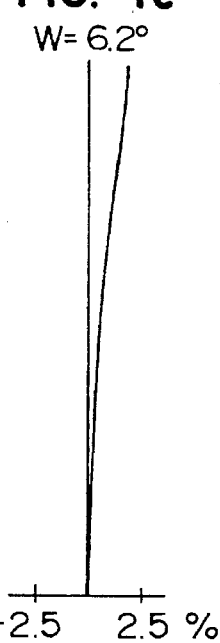
FIG. 4a — SPHERICAL ABERRATION / SINE CONDITION
FIG. 4b — SPHERICAL ABERRATION / CHROMATIC ABERRATION
FIG. 4c — TRANSVERSE CHROMATIC ABERRATION
FIG. 4d — ASTIGMATISM
FIG. 4e — DISTORTION

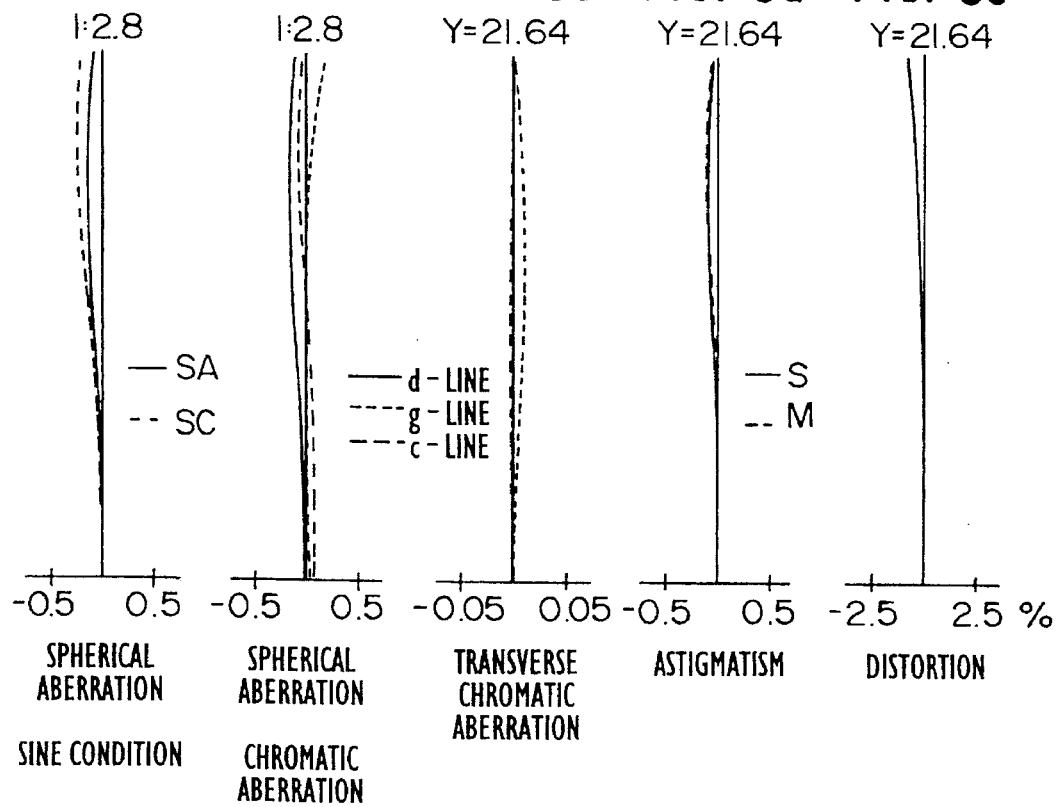
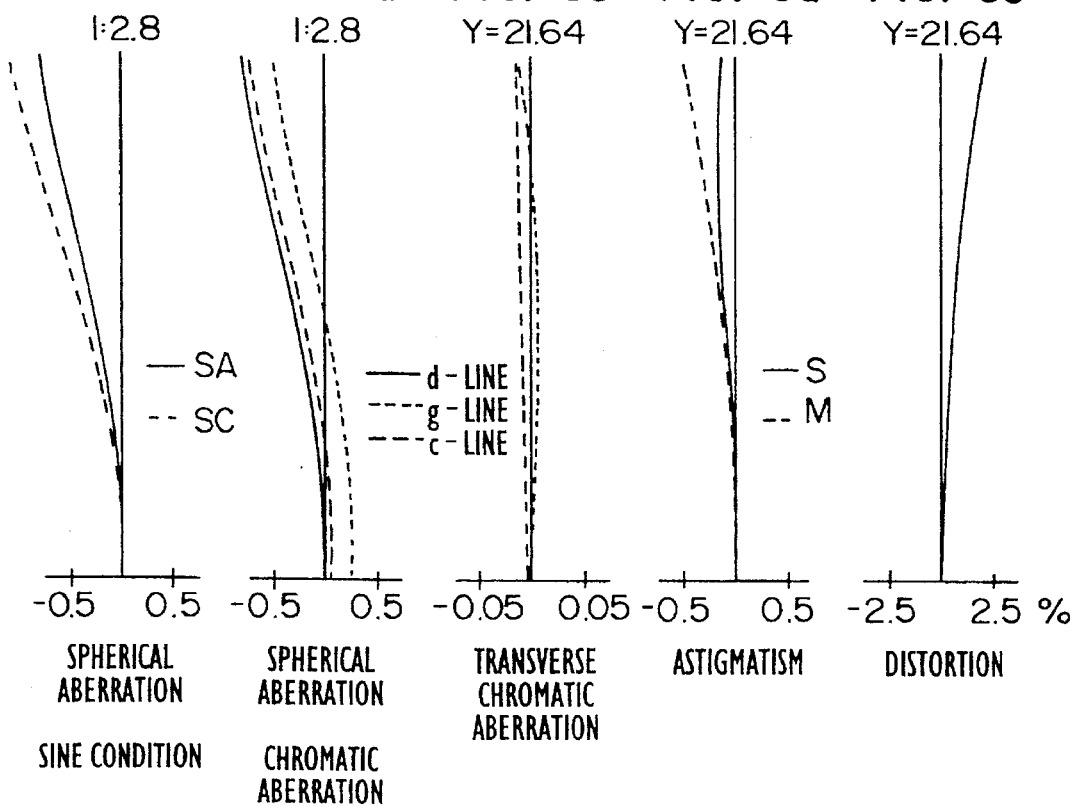

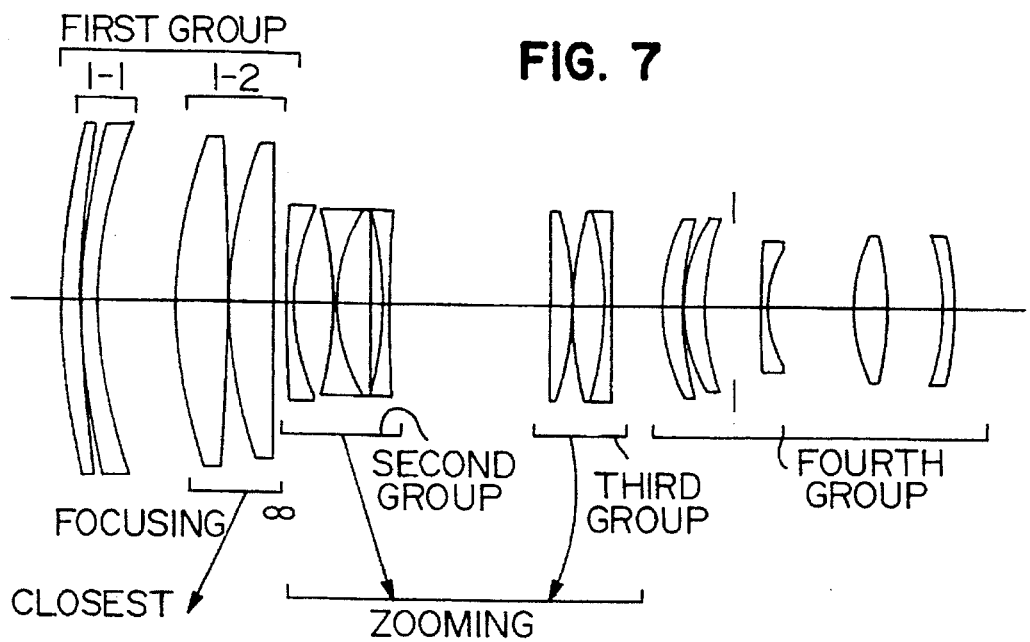
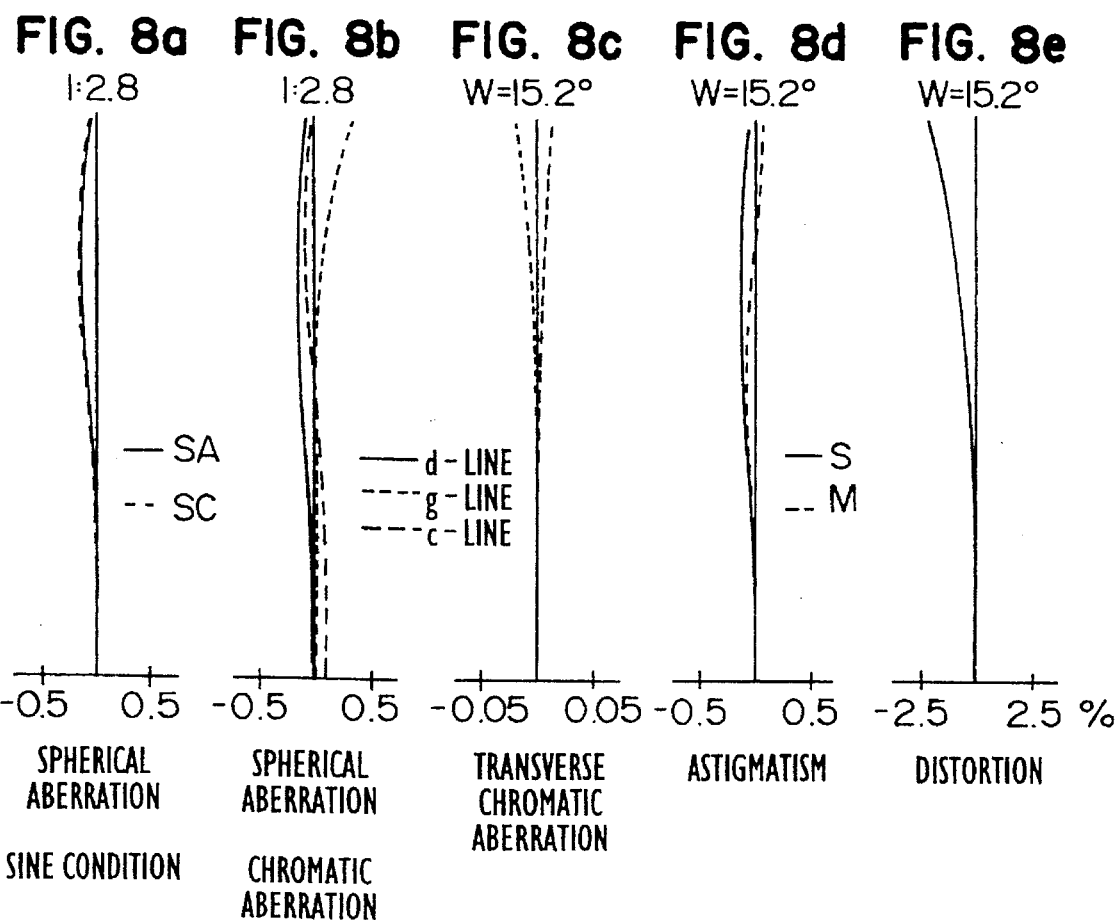

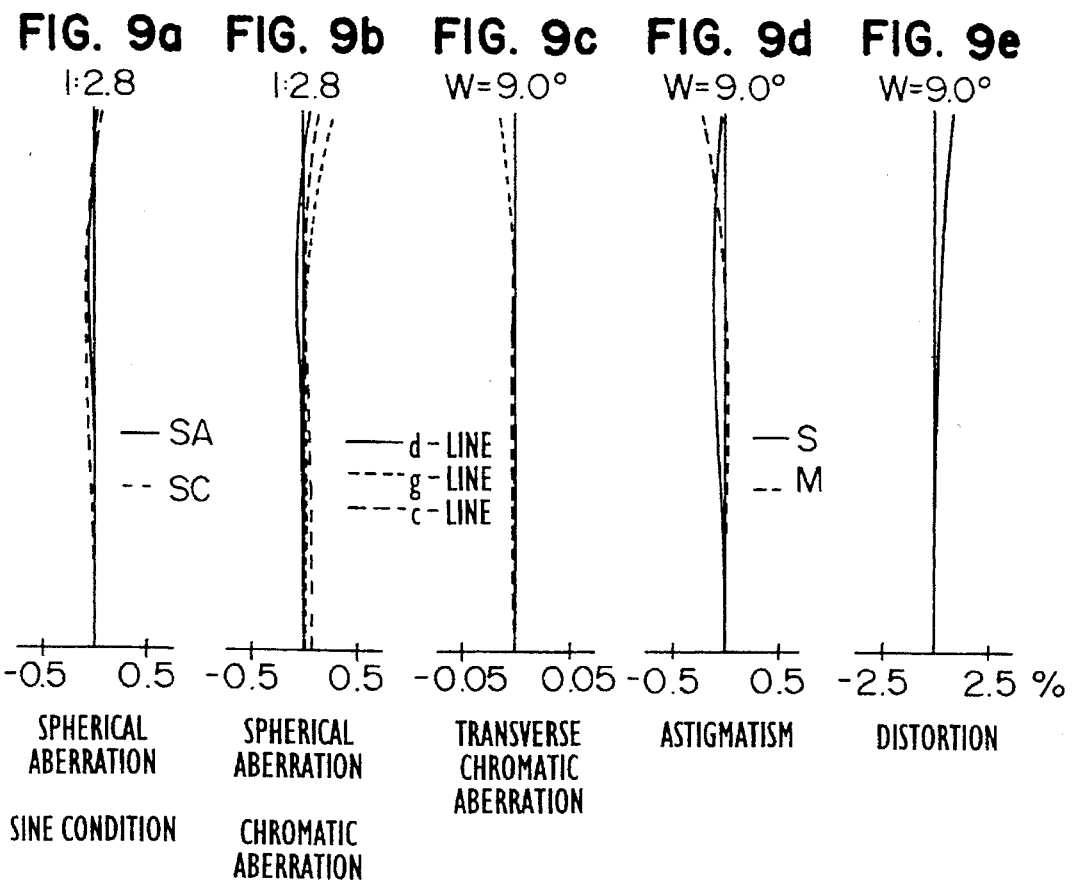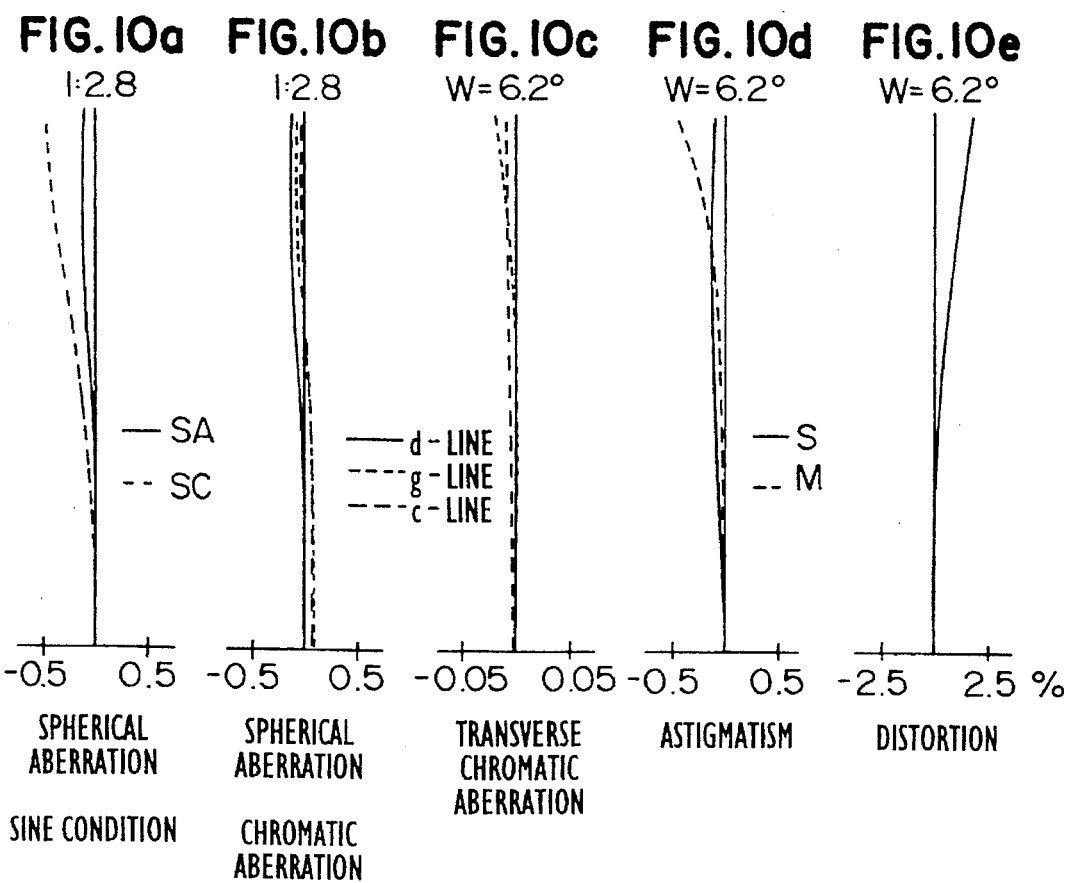

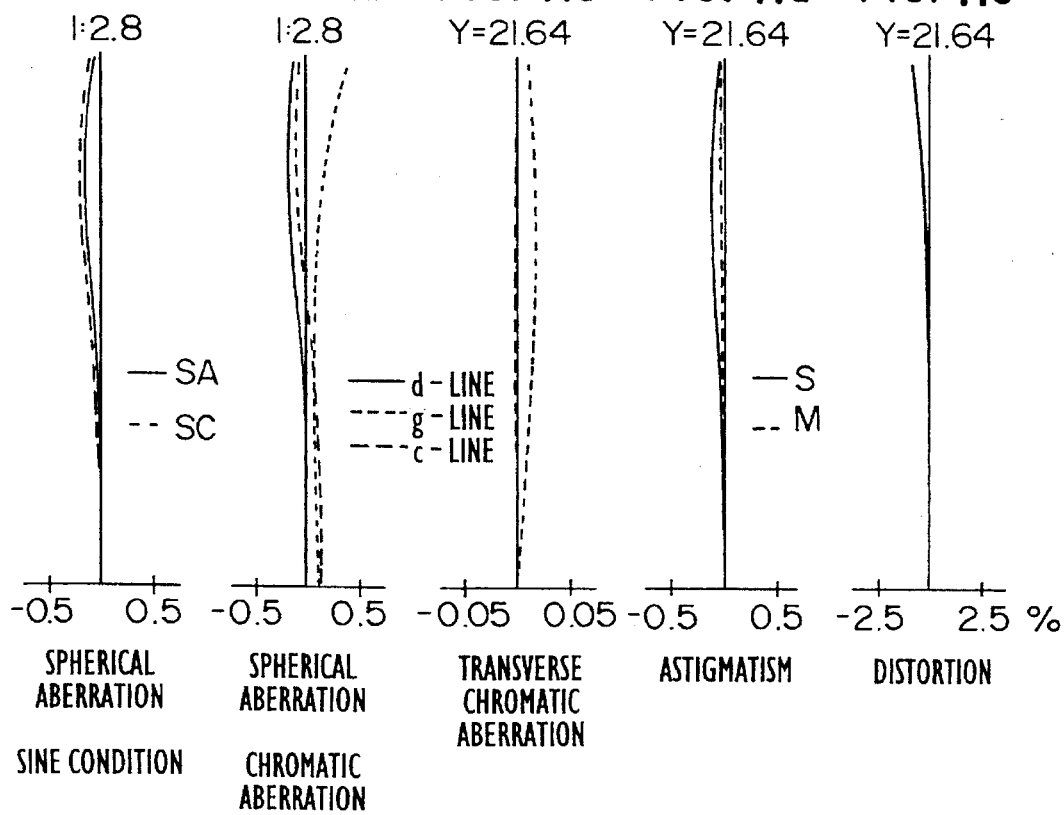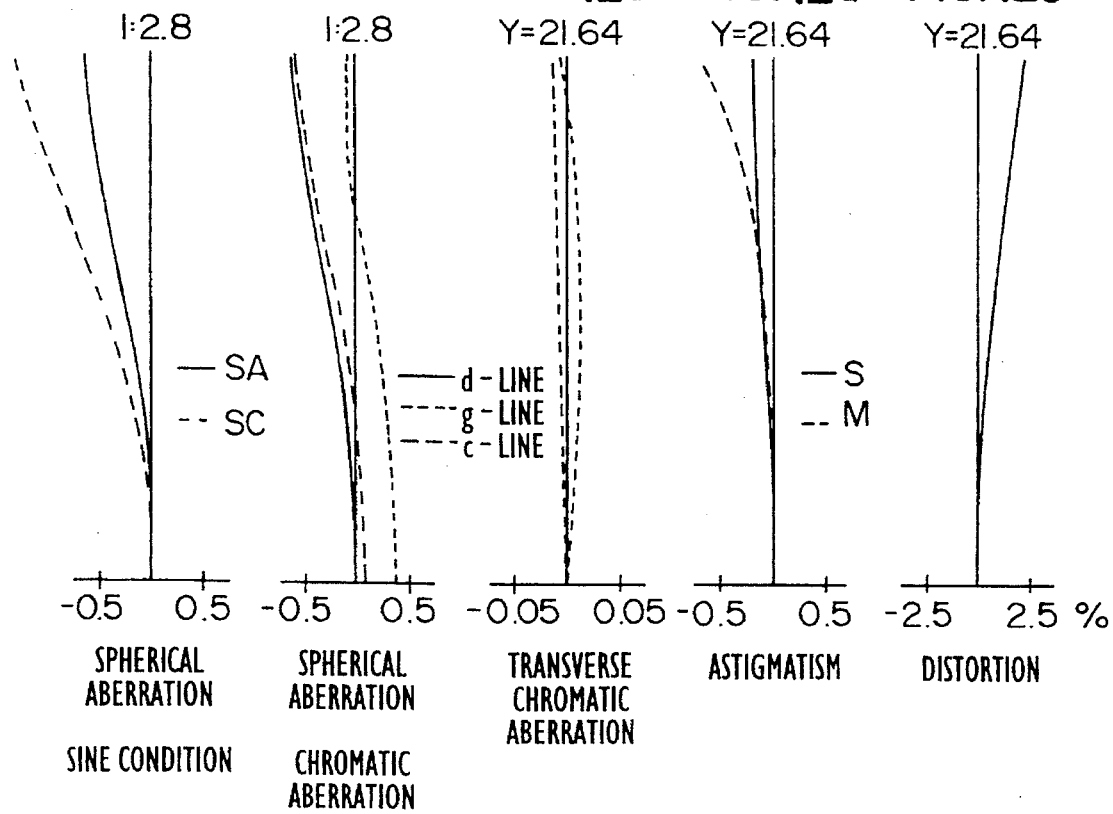

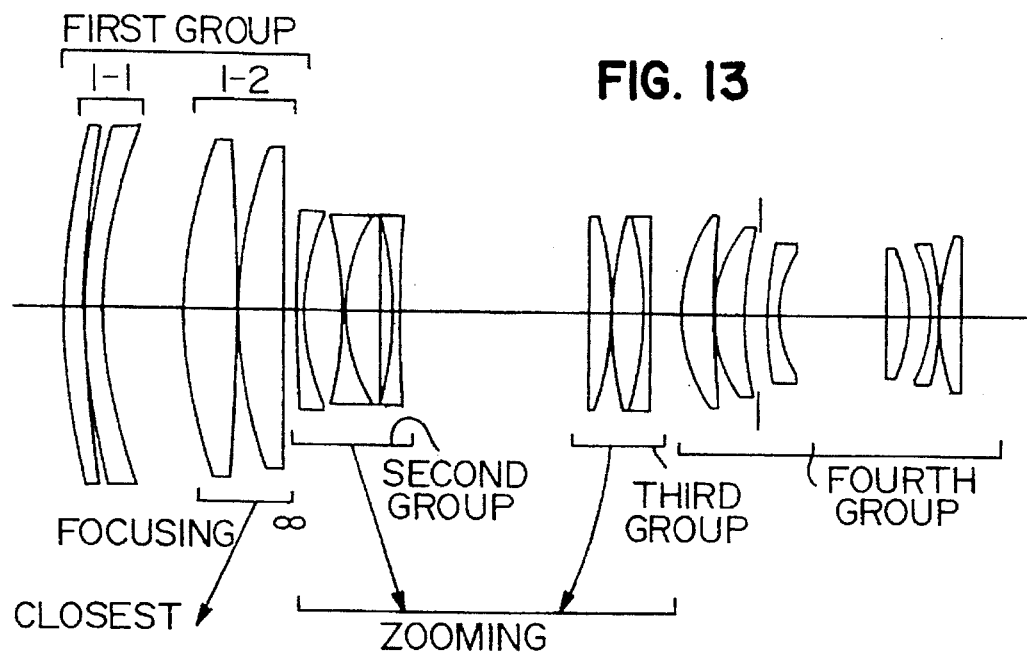
FIG. 13
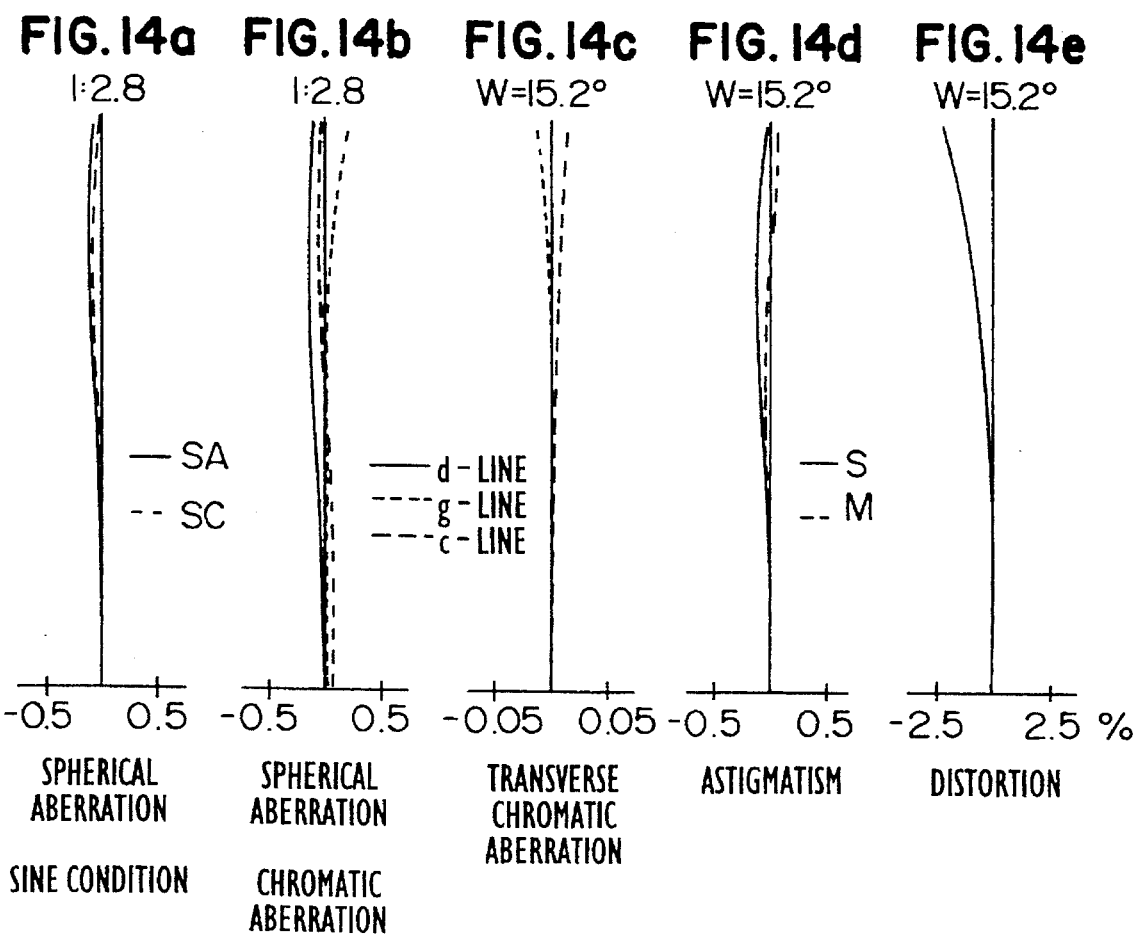

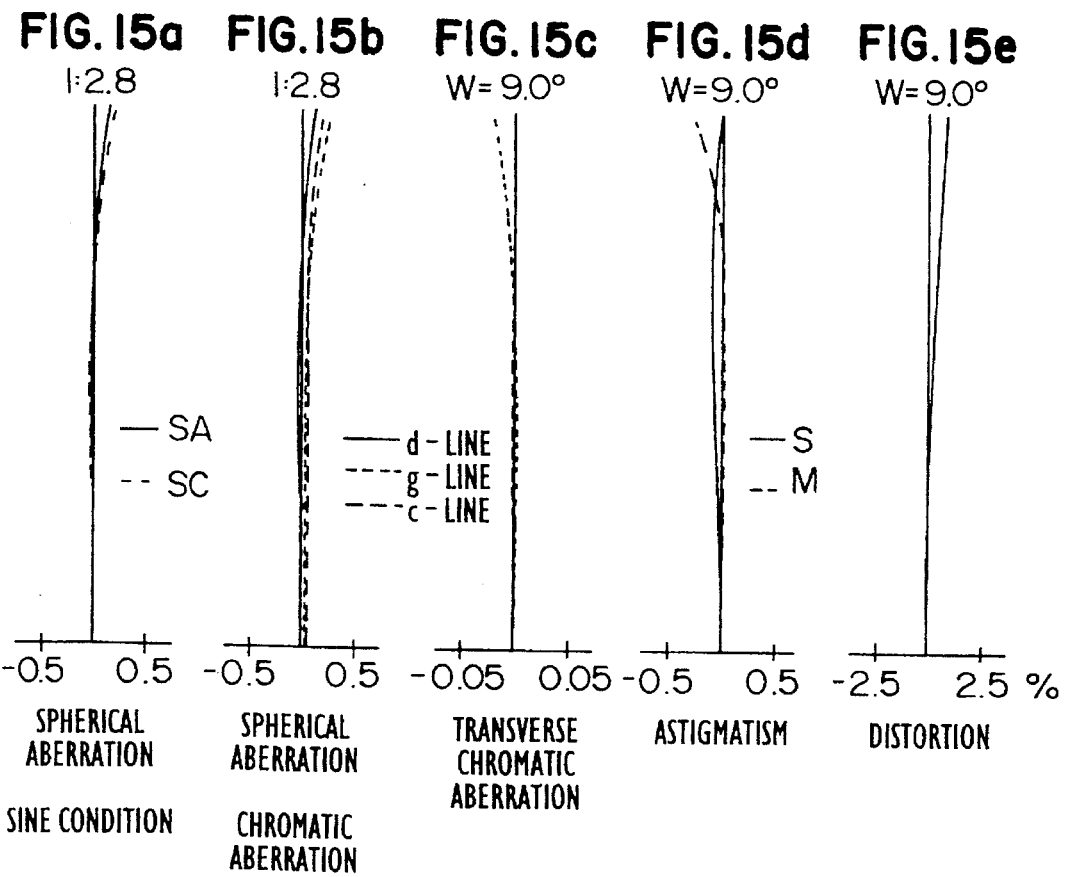
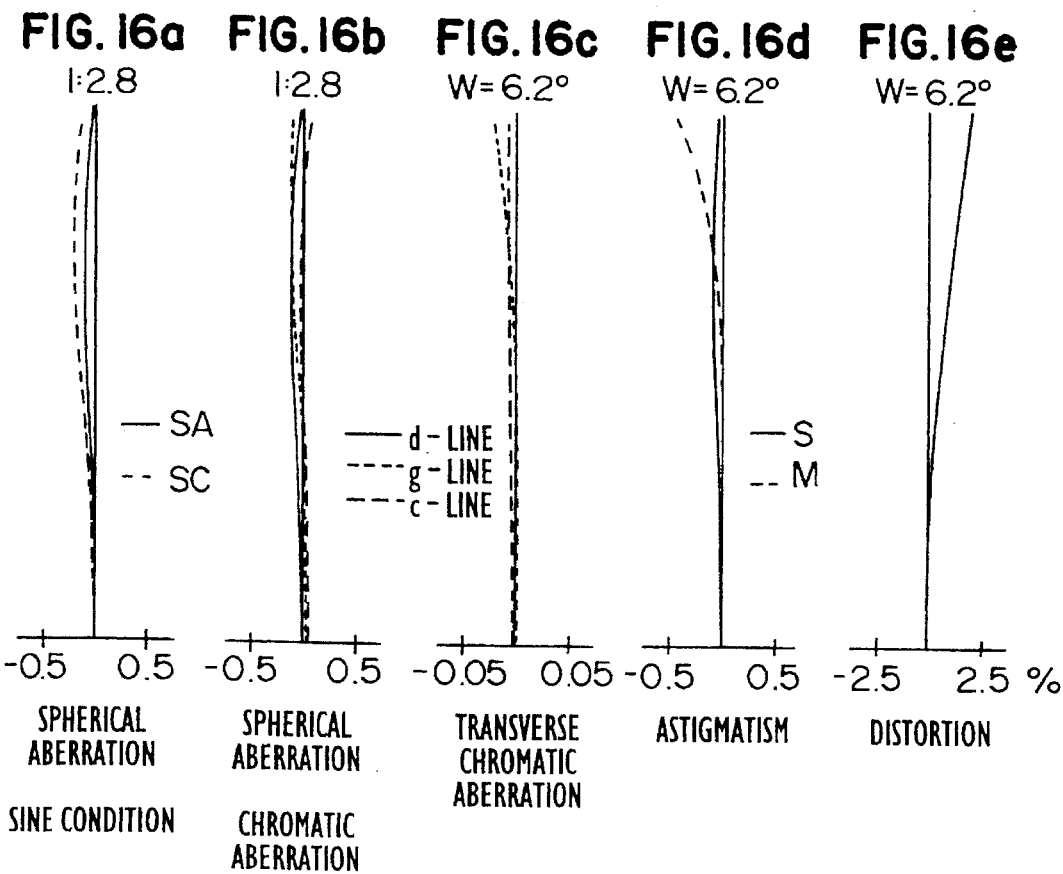

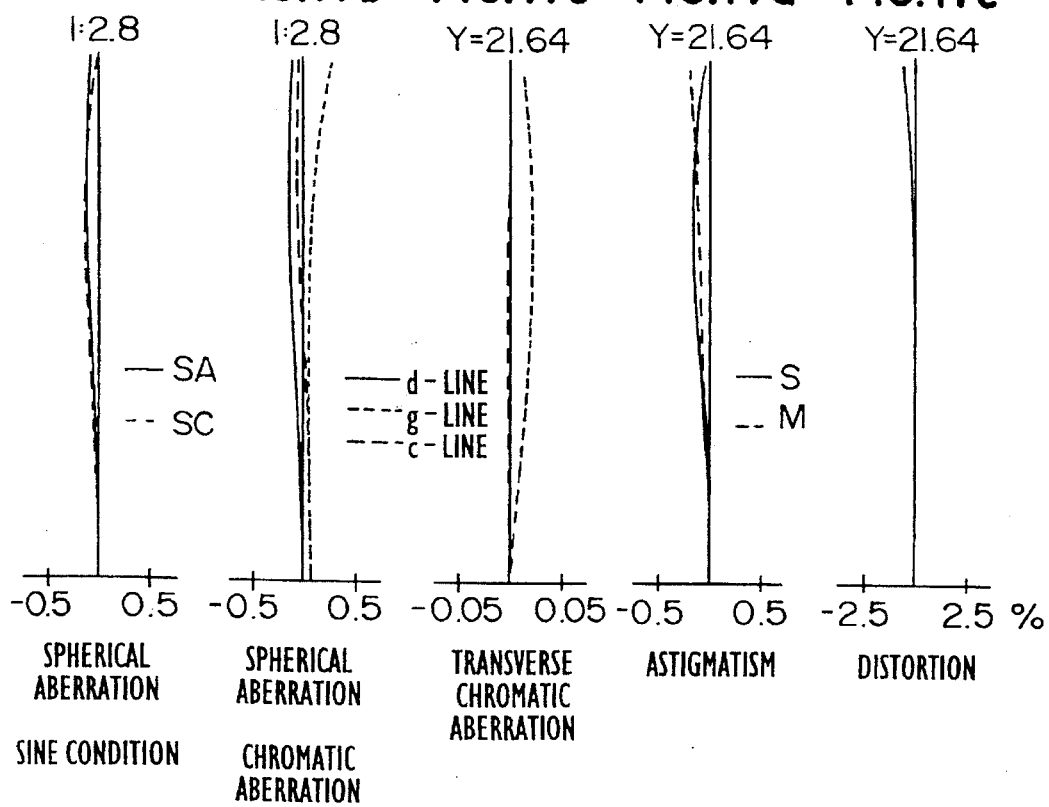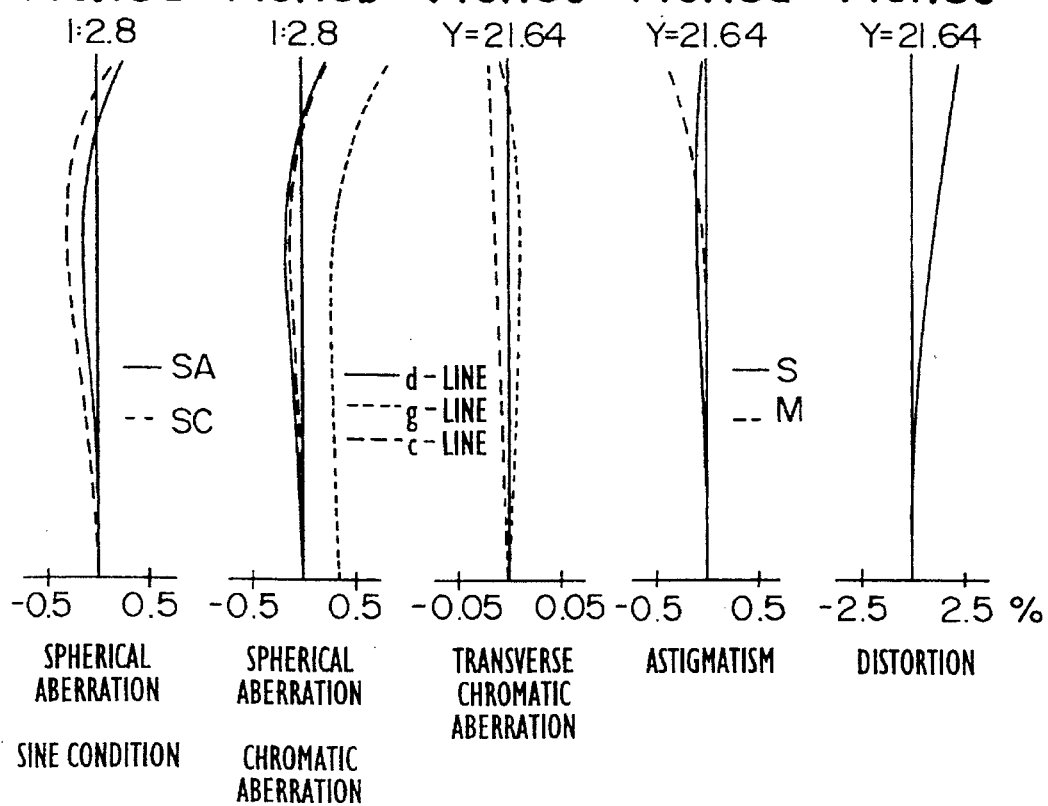

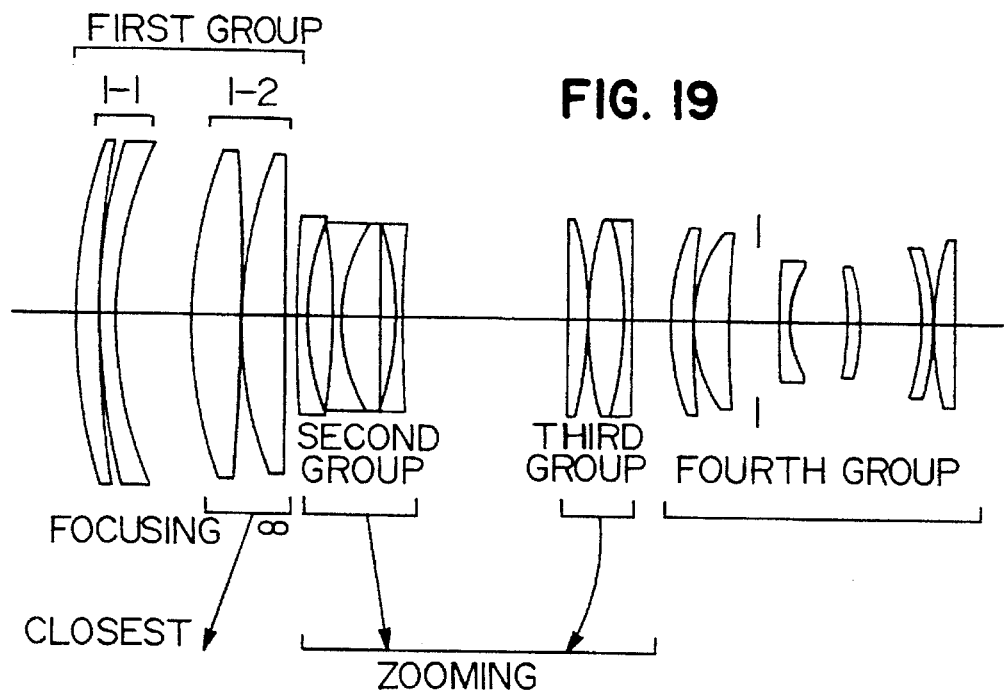
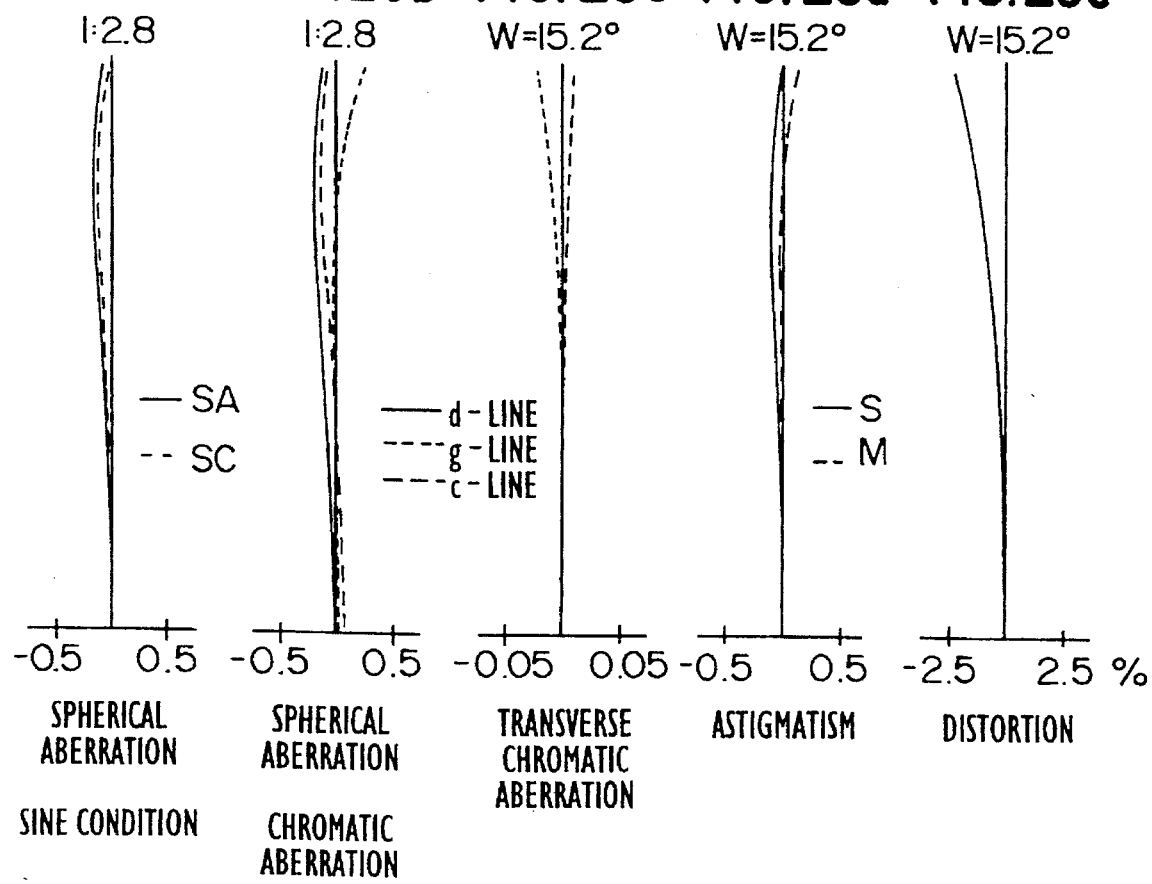

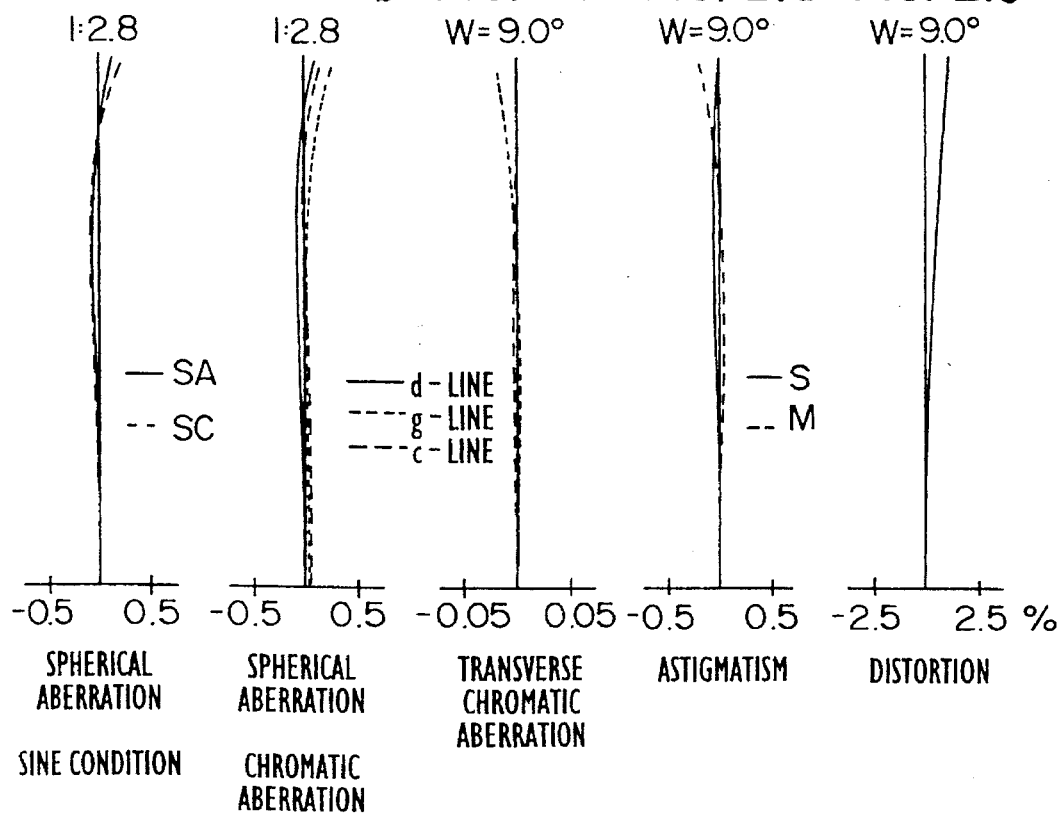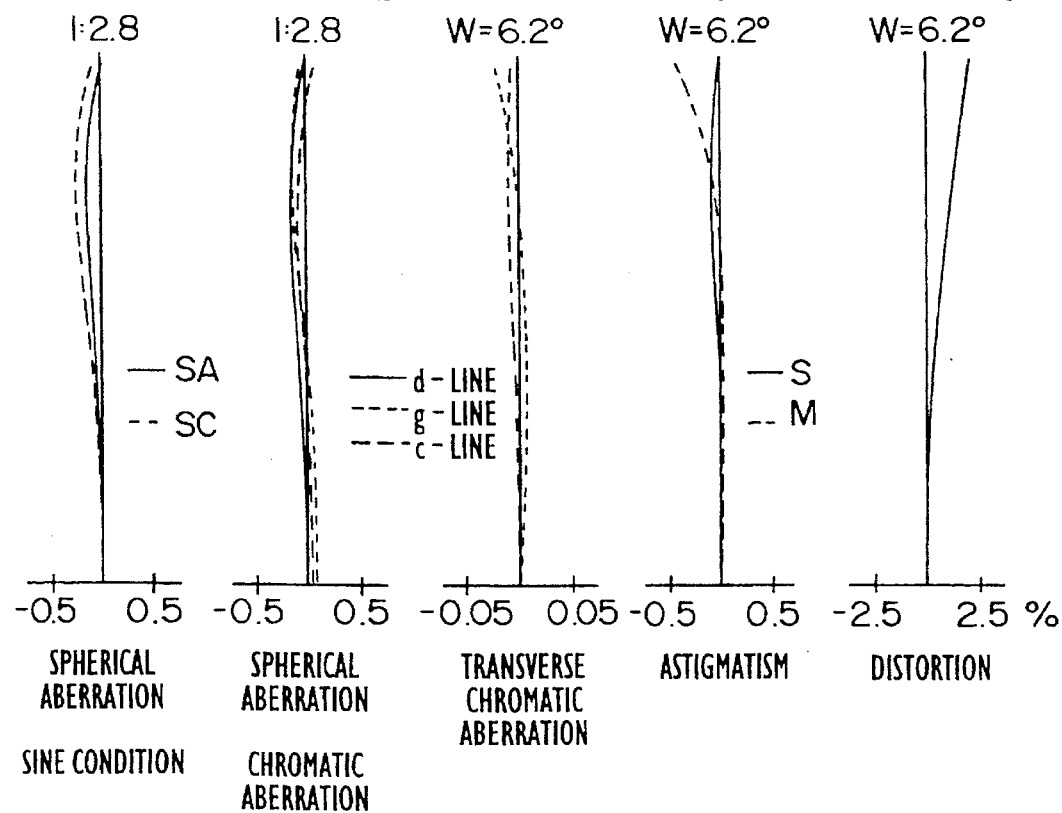

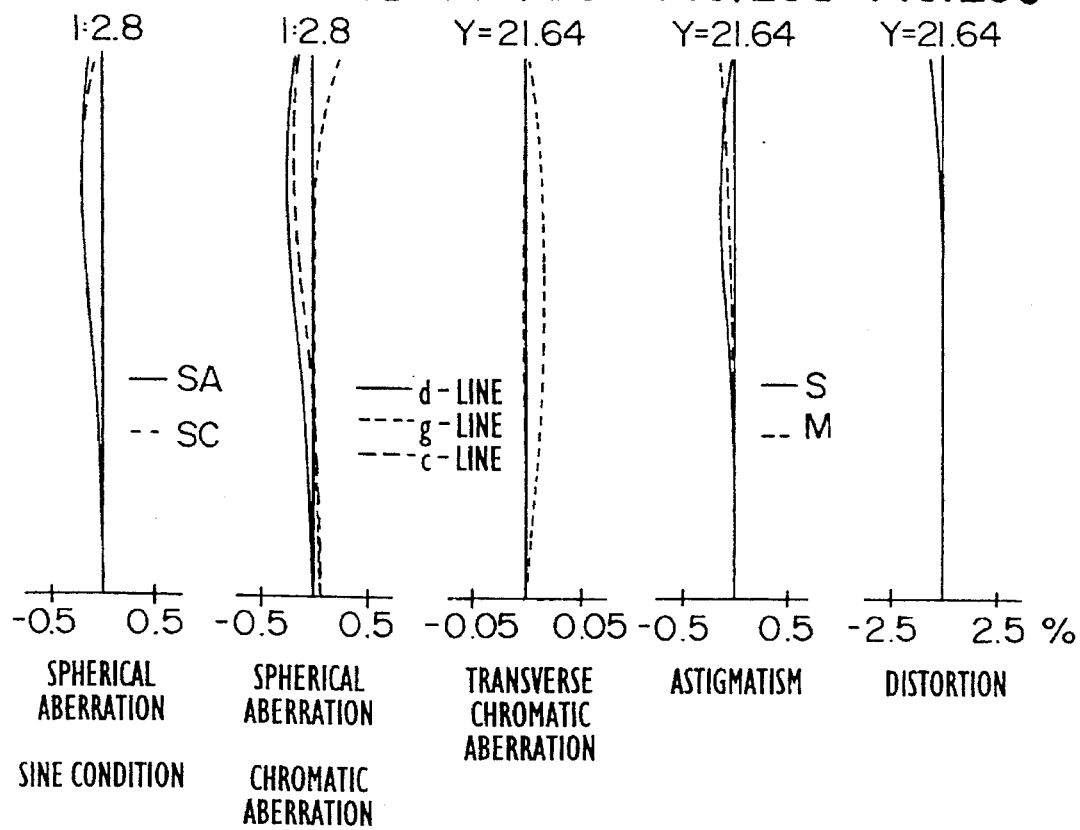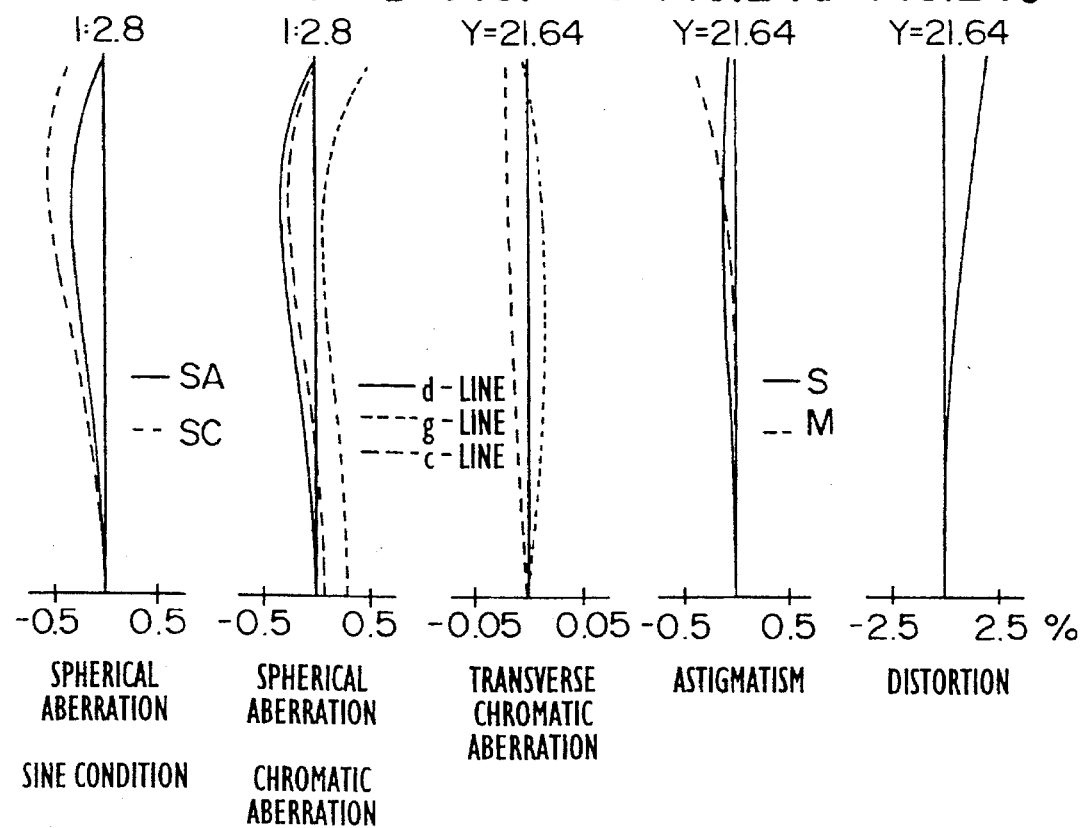

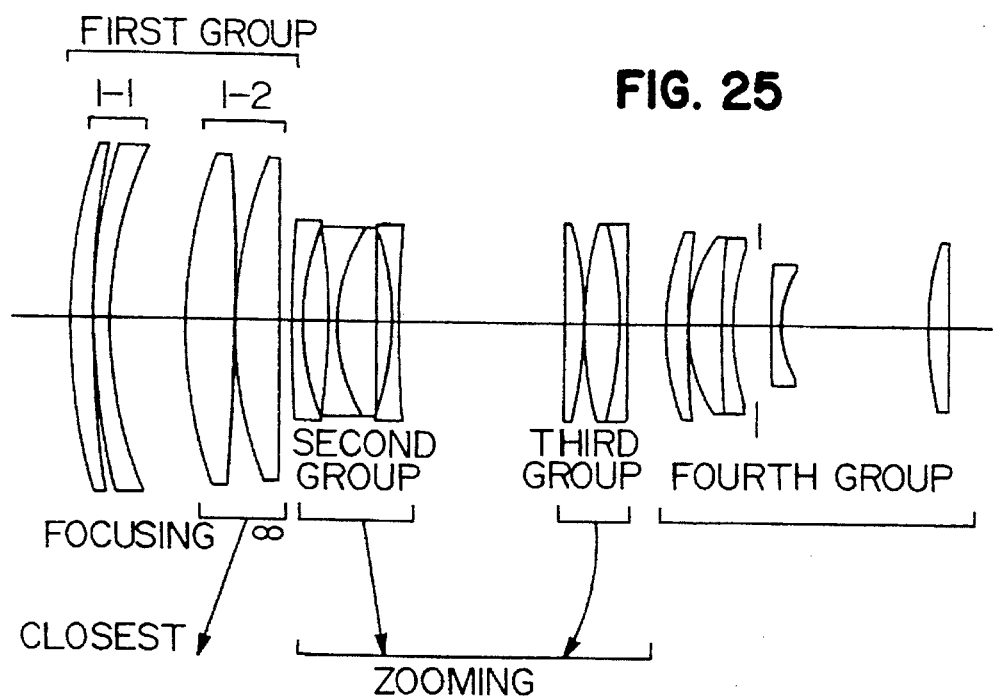
FIG. 25
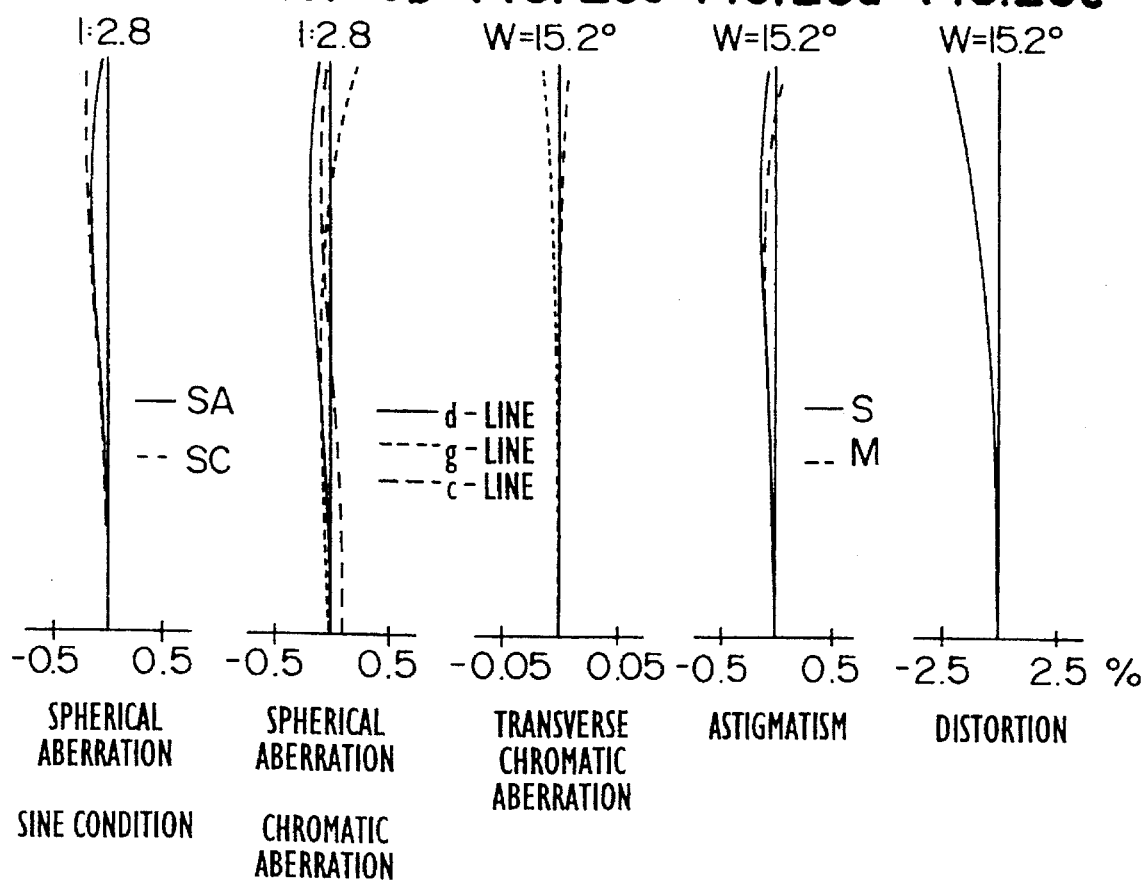

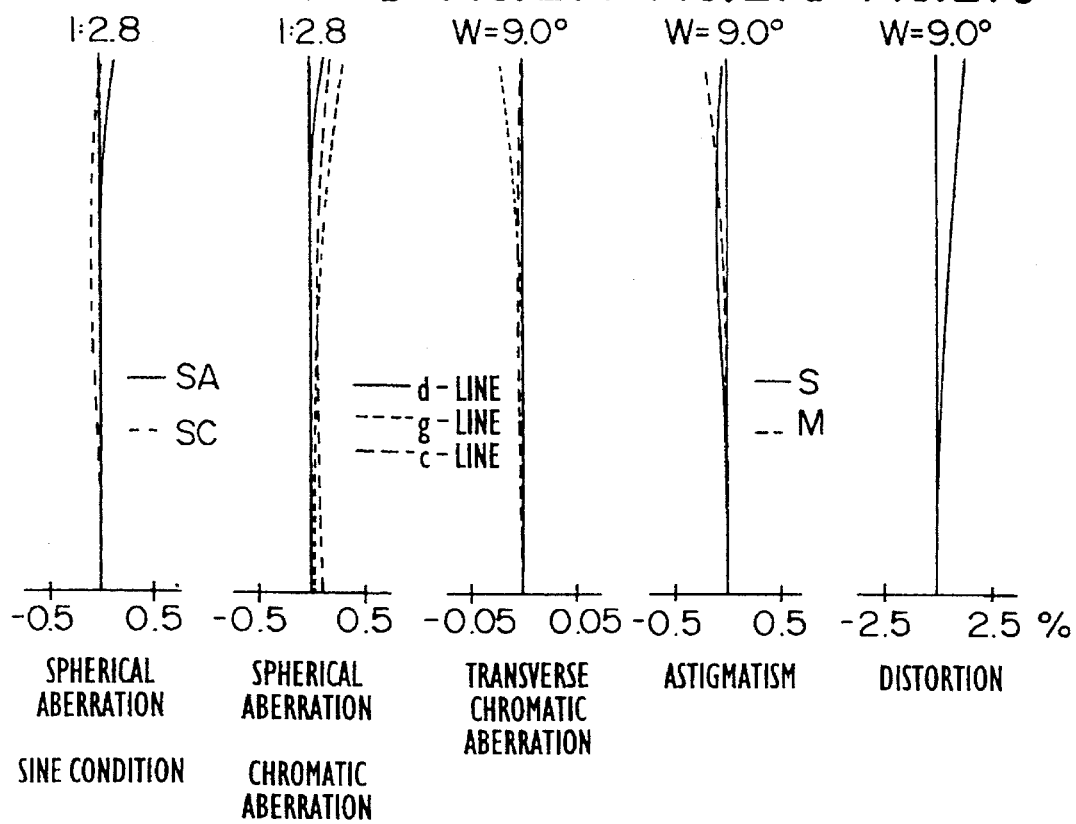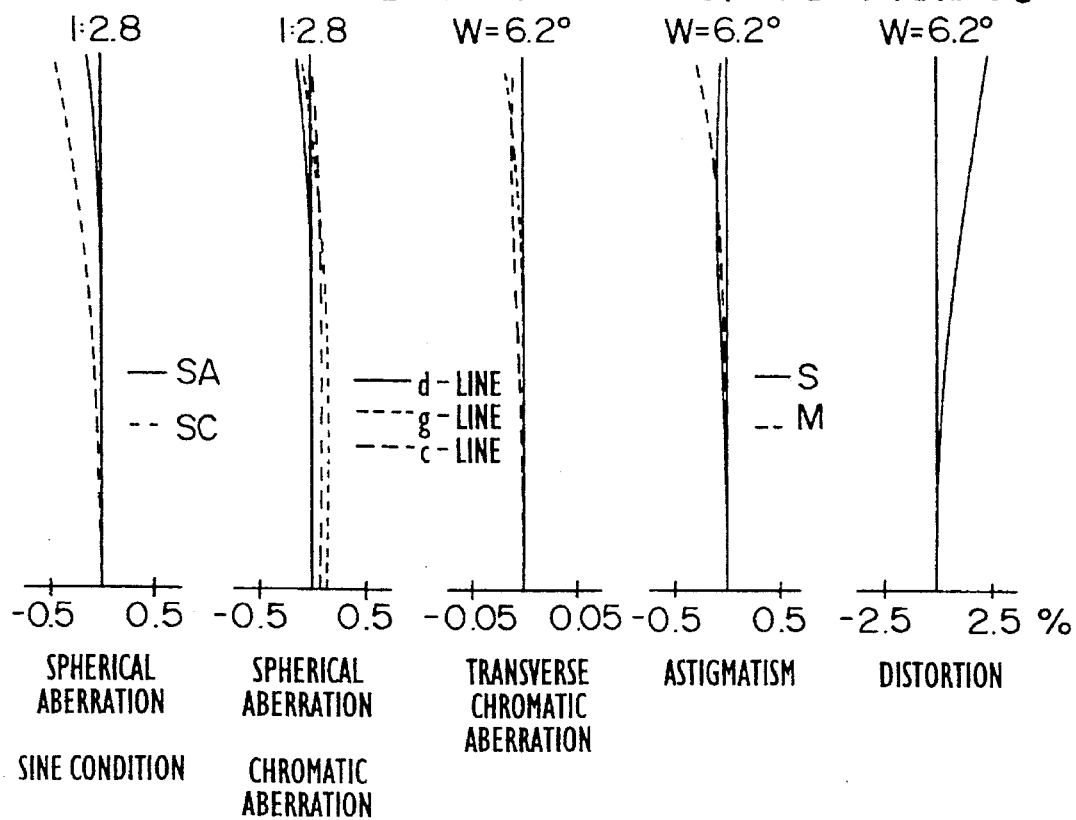

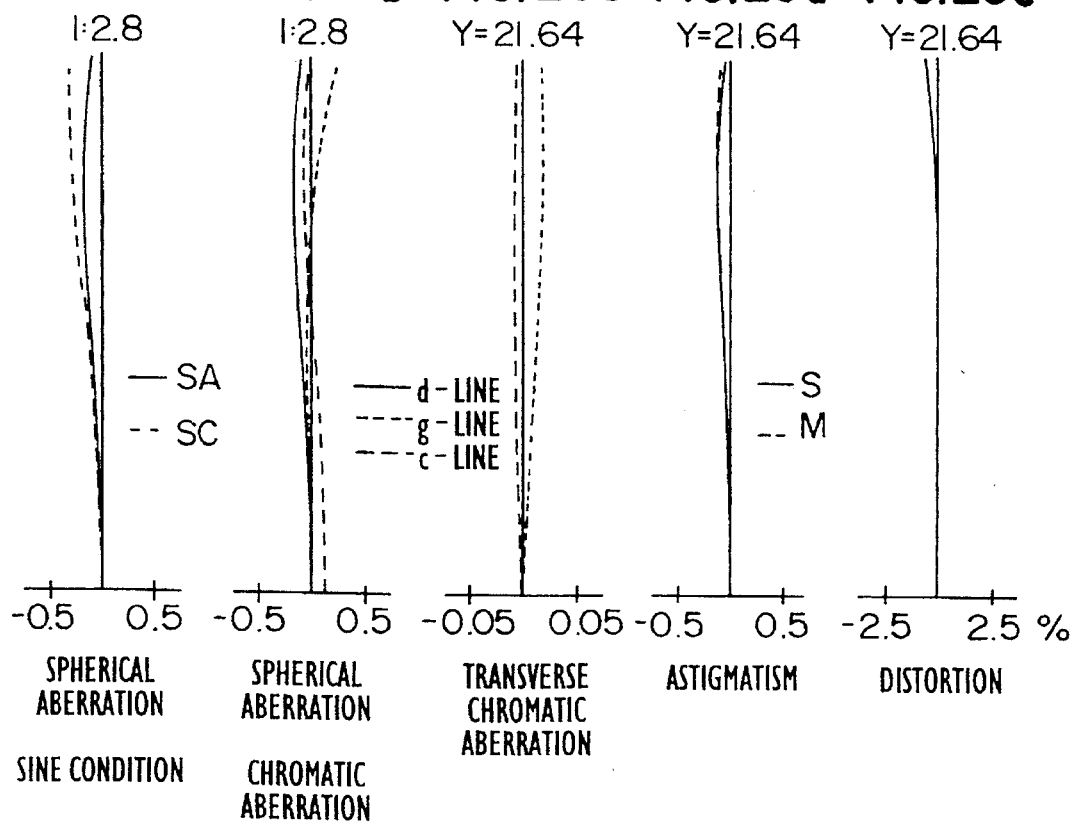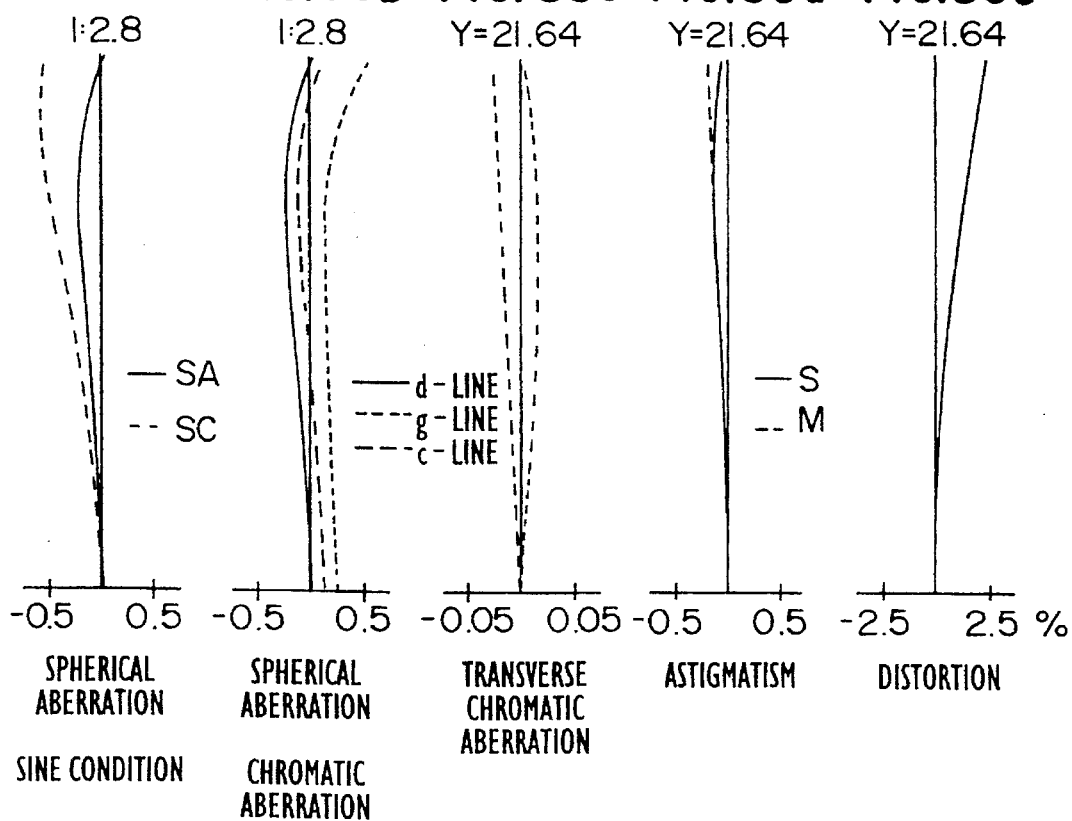

5,572,276

INNER FOCUS TYPE TELEPHOTO ZOOM LENS

This application is related to application Ser. No. 08/087,897, filed on Jul. 9, 1993, the disclosure of which is expressly incorporated herein by reference in its entirety.

BACKGROUND OF THE INVENTION

1. Field of the Invention

The present invention relates to a zoom lens in a single lens reflex (SLR) camera or the like, and more precisely, relates to en inner focus type telephoto zoom lens in which only a part of a lens system is moved to effect the focusing.

2. Description of Related Art

In known telephoto zoom lenses with three or four lens groups In which a first lens group has a positive power, it is preferable that a good image forming efficiency is guaranteed at the fully opened position of the diaphragm. Nevertheless, in general, various aberrations occur as the size of the aperture increases. Moreover, the aberrations vary depending on the object distance. In particular, there is considerable spherical aberration for macro photographing at the telephoto extremity. In an attempt to apply a zoom lens to an automatic focusing camera, an inner focus type zoom lens can be more advantageously used than a zoom lens in which the whole lens group is moved for focusing, especially in the case of a large aperture lens, which is heavy.

SUMMARY OF THE INVENTION

It is an object of the present invention to provide an inner focus type telephoto zoom lens having a high aperture ratio and exhibiting a good optical performance throughout the zoom range, such that a good image forming efficiency can be obtained regardless of the object distance.

To achieve the object mentioned above, according to an aspect of the present invention, there is provided an inner focus type telephoto zoom lens including a first lens group having a positive power, and a rear lens group of a variable power having a plurality of lens groups, located in this order from an object side. The first lens group is comprised of a first sub-group which is not moved upon focusing, and a second sub-group of movable positive lenses that are moved along an optical axis to carry out the focusing. The first sub-group and the second sub-group are arranged in this order from an object side.

Preferably, the second sub-group satisfies the relationship defined by (1) $v_{1-3} > 75$, wherein $v_{1-2}$ represents the mean value of Abbe numbers of all the lenses that constitute the second sub-group.

In an embodiment, the second sub-group includes two positive lenses whose Abbe numbers are larger than 75.

The positive lenses of the second sub-group can be provided with convex surfaces located on the object side.

The first sub-group includes one positive lens and one negative meniscus lens whose concave surface is located on an image side, arranged in this order from the object side.

Preferably, the first sub-group satisfies the relationship defined by (2) $-0.3 < f_1/f_{1-1} < 0$, wherein $f_{1-1}$ represents the focal length of the first sub-group; and $f_1$ represents the focal length of the first lens group at the infinity focus position, respectively.

Preferably, the positive lens of the first sub-group has an Abbe number larger than 75.

The rear lens group includes a negative variator lens group, a positive compensator lens group, and a positive relay lens group, so that the whole lens system includes four lens groups.

According to another aspect of the present invention, there is provided an inner focus type telephoto zoom lens including a first lens group having a positive power, and a rear lens group of a variable power having a plurality of lens groups, located in this order from an object side. The first lens group includes a first negative sub-group which is not moved upon focusing, and a second positive sub-group that is moved along an optical axis to provide focusing. The first negative sub-group and the second positive sub-group are arranged in this order from an object side. The first sub-group satisfies the relationship defined by the formula (2) mentioned above.

The first sub-group includes one positive lens and one negative meniscus lens whose concave surface is located on an image side, arranged in this order from the object side.

Preferably, the second sub-group consists of positive lenses.

Preferably, the second sub-group satisfies the relationship defined by the formula (1) mentioned above.

The second sub-group includes two positive lenses whose Abbe numbers are larger than 75.

The positive lenses of the second sub-group can be provided with convex surfaces located on the object side.

The present disclosure relates to subject matter contained in Japanese patent application No. 05-283617 (filed on Nov. 12, 1993) which is expressly incorporated herein by reference in its entirety.

BRIEF DESCRIPTION OF THE DRAWINGS

The invention will be described below in detail with reference to the accompanying drawings, in which;

FIG. 1 is a schematic view of a lens arrangement of an inner focus type telephoto zoom -lens, according to a first embodiment of the present invention;

FIGS. 2a–2e show aberration diagrams of the telephoto zoom lens shown in FIG. 1, at the shortest focal length and an infinite object distance;

FIGS. 3a–3e show aberration diagrams of the telephoto zoom lens shown in FIG. 1, at an intermediate focal length and an infinite object distance;

FIGS. 4a–4e show aberration diagrams of the telephoto zoom lens shown in FIG. 1, at the longest focal length and an infinite object distance;

FIGS. 5a–5e show aberration diagrams of the telephoto zoom lens shown in FIG. 1, at the shortest focal length and an object distance of 1.5 m;

FIGS. 6a–6e show aberration diagrams of the telephoto zoom lens shown in FIG. 1, at the longest focal length and an object distance of 1.5 m;

FIG. 7 is a schematic view of a lens arrangement of an inner focus type telephoto zoom lens, according to a second embodiment of the present invention;

FIGS. 8a–8e show aberration diagrams of the telephoto zoom lens shown in FIG. 7, at the shortest focal length and an infinite object distance;

FIGS. 9a–9e show aberration diagrams of the telephoto zoom lens shown in FIG. 7, at an intermediate focal length and an infinite object distance;

FIGS. 10a–10e show aberration diagrams of the telephoto zoom lens shown in FIG. 7, at the longest focal length and an infinite object distance;

FIGS. 11a–11e show aberration diagrams of the telephoto zoom lens shown in FIG. 7, at the shortest focal length and an object distance of 1.5 m;

FIGS. 12a–12e show aberration diagrams of the telephoto zoom lens shown in FIG. 7, at the longest focal length and an object distance of 1.5 m;

FIG. 13 is a schematic view of a lens arrangement of an inner focus type telephoto zoom lens, according to a third embodiment of the present invention;

FIGS. 14a–14e show aberration diagrams of the telephoto zoom lens shown in FIG. 13, at a shortest focal length and an infinite object distance:

FIGS. 15a–15e show aberration diagrams of the telephoto zoom lens shown in FIG. 13, at an intermediate focal length and an infinite object distance;

FIGS. 16a–16e show aberration diagrams of the telephoto zoom lens shown in FIG. 13, at the longest local length and an infinite object distance;

FIGS. 17a–17e show aberration diagrams of the telephoto zoom lens shown in FIG. 13, at the shortest focal length and an object distance of 1.5 m;

FIGS. 18a–18e show aberration diagrams of the telephoto zoom lens shown in FIG. 13, at the longest focal length and an object distance of 1.5 m;

FIG. 19 is a schematic view of e lens arrangement of an inner focus type telephoto zoom lens, according to a fourth embodiment of the present invention;

FIGS. 20a–20e show aberration diagrams of the telephoto zoom lens shown in FIG. 19, at the shortest focal length and an infinite object distance;

FIGS. 21a–21e shows aberration diagrams of the telephoto zoom lens shown in FIG. 19, at an intermediate focal length and an infinite object distance;

FIGS. 22a–22e show aberration diagrams of the telephoto zoom lens shown in FIG. 19, at the longest focal length and an infinite object distance;

FIGS. 23a–23e show aberration diagrams of the telephoto zoom lens shown in FIG. 19, at the shortest focal length and an object distance of 1.5 m;

FIGS. 24a–24e show aberration diagrams of the telephoto zoom lens shown in FIG. 19, at the longest focal length and an object distance of 1.5 m;

FIG. 25 is a schematic view of a lens arrangement of an inner focus type telephoto zoom lens, according to a fifth embodiment of the present invention;

FIGS. 26a–26e show aberration diagrams of the telephoto zoom lens shown in FIG. 25, at the shortest focal length and an infinite object distances;

FIGS. 27a–27e show aberration diagrams of the telephoto zoom lens shown in FIG. 25, at an intermediate focal length and an infinite object distance;

FIGS. 28a–28e show aberration diagrams of the telephoto zoom lens shown in FIG. 25, at the longest focal length and an infinite object distance;

FIGS. 29a–29e show aberration diagrams of the telephoto zoom lens shown in FIG. 25, at the shortest focal length and an object distance of 1.5 m: and, FIGS. 30a–29e show aberration diagrams of the telephoto zoom lens shown in FIG. 25, at the longest focal length and an object distance of 1.5 m.

DESCRIPTION OF THE PREFERRED EMBODIMENT

In a telephoto zoom lens according to the present invention, a first lens group of a positive power is split into a front first sub group of lenses and a rear second sub group of lenses which constitutes a focusing lens group. Generally speaking, in a zoom lens, aberrations are preferably corrected for each lens group to restrict or limit a variation of aberration due to the movement of the lens groups. The inventor of the present invention has found that if the second sub lens group includes a plurality of positive lenses having no negative lens, the following advantages can be expected owing to an absence of a negative lens:

1) a space which would be otherwise necessary to accommodate the negative lens can be used as a space for the movement of the focusing lens groups; and, 2) the movable lens group has a strong positive power, so that the displacement of the lens group during the focusing can be reduced.

Consequently, close-up photographing can be executed while keeping the whole lens arrangement compact.

In the present invention the second sub lens group is designed so as to reduce the aberration variation caused by the movement of the lens group(s) to a practically acceptable level without having a negative lens. Generally, a negative lens is required to correct chromatic aberration and spherical aberration in the lens groups.

In particular, in the present invention the second sub lens group having a positive power includes a plurality of positive lenses whose average Abbe number is preferably more than 75 (formula (1)). Consequently, not only can the chromatic aberration of the second sub group be restricted, but the chromatic aberration variation can also be minimized during the movement of the second sub lens group. It was experimentally confirmed that when the second sub group included two positive lenses whose Abbe numbers were both more than 75, a good result was obtained.

Moreover, the positive lenses of the second sub group are preferably shaped such that the convex surfaces thereof are located adjacent to an object to be photographed, so that not only can the spherical aberration of the second sub group be restricted, but also the spherical aberration variation can also be minimized during the movement of the second sub group.

Furthermore, in the present invention, the first sub lens group preferably includes one positive lens and one negative meniscus lens whose concave surface is located adjacent to an image, so that the second sub lens group and the lens groups subsequent thereto can be made small, leading to a miniaturization of the whole zoom lens.

If the power of the first sub lens group meets the requirement defined by formula (2), the variation of the spherical aberration due to a difference in the incident angle during close-up photography can be cancelled by the variation of the spherical aberration caused by the displacement of the second sub lens group.

Moreover, if the positive lenses of the first sub lens group are made of a material whose Abbe number is larger than 75, the chromatic aberration can be effectively corrected.

The following discussion will be directed to five embodiments of the present invention. In each embodiment, the first lens group includes a first stationary sub lens group which is immovable upon focusing, and a second movable sub lens group which is moved during focusing. The first sub lens group includes one positive lens and one negative meniscus lens whose concave surface is located on the image side, in this order from the object side. The second sub lens group includes two positive lenses whose concave surfaces of higher power are oriented towards the object side. The rear lens groups behind the first lens group includes a negative variator lens group (second lens group), a positive compensator lens group (third lens group), and a positive relay lens group (fourth lens group). The loci of the movement of the lenses during the zooming and the loci of the movement of the second sub lens group during the focusing are indicated at lower portions of the drawings for the lens arrangement.

First Embodiment

FIG. 1 shows a lens arrangement of an inner focus type of telephoto zoom lens, according to a first embodiment of the present invention.

Numerical data of the zoom lens system shown in FIG. 1 is shown in Table 1 below. Diagrams of various aberrations thereof for the infinity focus position at the wide-angle extremity, an intermediate focal length, and the telephoto extremity are shown in FIGS. 2a–2e, 3a–3e and 4a–4e, respectively. Diagrams of various aberrations thereof at an object distance of 1.5 m at the wide-angle extremity and the telephoto extremity are shown in FIGS. 5a–5e and 6a–6e, respectively. In the aberration diagrams, "SA" represents the spherical aberration, "SC" represents the sine condition, "d-line", "g-line" and "c-line" represent the chromatic aberration represented by the spherical aberration and the transverse chromatic aberration, at the respective wavelengths, "S" represents the sagittal ray, and "M" represents the meridional ray, respectively.

In the tables and the drawings, "$F_{NO}$" represents the f-number, "f" represents the focal length, "ω" represents the half angle of view, "$f_s$" the back-focal distance, "R" the radius of curvature of each lens surface, "D" represents the thicknesses of lenses or the distance between the lenses, "$N_d$" represents the refractive index of the d-line, and "$v_d$" represents the Abbe number of the d-line, respectively.

TABLE 1

$F_{NO} = 1:2.8$
$f = 81.63–135.00–196.00$
$ω = 15.2–9.0–6.2$
$f_s = 47.47–47.47–47.47$

| Surface No. | r | d | $N_d$ | $v_d$ |
|---|---|---|---|---|
| 1 | 105.083 | 5.95 | 1.49700 | 81.6 |
| 2 | 208.772 | 0.20 | — | — |
| 3 | 129.500 | 3.00 | 1.78472 | 25.7 |
| 4 | 79.734 | 13.86 | — | — |
| 5 | 91.263 | 10.66 | 1.43875 | 95.0 |
| 6 | −607.556 | 0.10 | — | — |
| 7 | 84.915 | 8.39 | 1.49700 | 81.6 |
| 8 | 1637.523 | 2.81–23.70–32.73 | — | — |
| 9 | −3983.565 | 2.00 | 1.51633 | 64.1 |
| 10 | 37.251 | 7.01 | — | — |
| 11 | −109.148 | 1.50 | 1.69680 | 55.5 |
| 12 | 39.495 | 6.39 | 1.80518 | 25.4 |
| 13 | 1453.456 | 3.40 | — | — |
| 14 | −61.336 | 1.60 | 1.80400 | 46.6 |
| 15 | −210.430 | 32.51–18.04–2.25 | — | — |
| 16 | 681.629 | 4.16 | 1.69680 | 55.5 |
| 17 | −92.242 | 0.20 | — | — |
| 18 | 106.306 | 6.83 | 1.51633 | 64.1 |
| 19 | −68.751 | 1.70 | 1.80518 | 25.4 |
| 20 | −241.650 | 7.72–1.30–8.06 | — | — |
| 21 | 43.113 | 5.89 | 1.49700 | 81.6 |
| 22 | 254.971 | 0.10 | — | — |
| 23 | 31.776 | 4.88 | 1.48749 | 70.2 |
| 24 | 62.883 | 2.50 | 1.80518 | 25.4 |
| 25 | 60.494 | 7.88 | — | — |
| 26 | 69.278 | 2.06 | 1.83481 | 42.7 |

TABLE 1-continued $F_{NO} = 1:2.8$
$f = 81.63–135.00–196.00$
$ω = 15.2–9.0–6.2$
$f_s = 47.47–47.47–47.47$

| Surface No. | r | d | $N_d$ | $v_d$ |
|---|---|---|---|---|
| 27 | 22.314 | 38.09 | — | — |
| 28 | 53.028 | 4.66 | 1.48749 | 70.2 |
| 29 | 1621.579 | — | — | — |

Second Embodiment

FIG. 7 shows a lens arrangement of a zoom lens system according to a second embodiment of the present invention.

Numerical data of the zoom lens system shown in FIG. 7 is shown in Table 2 below. Diagrams for various aberrations thereof for the infinity focus position at the wide-angle extremity, an intermediate focal length, end the telephoto extremity are shown in FIGS. 8a–8e, 9a–9e and 10a–10e, respectively. Diagrams of various aberrations thereof at an object distance of 1.5 m at the wide-angle extremity and the telephoto extremity are shown in FIGS. 11a–11e and 12a–12e, respectively.

TABLE 2

$F_{NO} = 1:2.8$
$f = 81.63–135.00–195.00$
$ω = 15.2–9.0–6.2$
$f_s = 43.50–43.50–43.50$

| Surface No. | r | d | $N_d$ | $v_d$ |
|---|---|---|---|---|
| 1 | 135.202 | 4.39 | 1.51633 | 64.1 |
| 2 | 218.808 | 0.20 | — | — |
| 3 | 153.309 | 3.40 | 1.80518 | 25.4 |
| 4 | 90.799 | 16.92 | — | — |
| 5 | 96.331 | 11.21 | 1.43875 | 95.0 |
| 6 | −534.222 | 0.10 | — | — |
| 7 | 90.859 | 9.47 | 1.49700 | 81.6 |
| 8 | 3738.938 | 2.81–27.34–37.15 | — | — |
| 9 | 203.381 | 1.80 | 1.51633 | 64.1 |
| 10 | 49.290 | 7.31 | — | — |
| 11 | −100.848 | 1.70 | 1.69680 | 55.5 |
| 12 | 40.880 | 6.57 | 1.80518 | 25.4 |
| 13 | −2463.027 | 2.39 | — | — |
| 14 | −83.113 | 1.70 | 1.80400 | 46.6 |
| 15 | 202.763 | 33.85–18.74–2.50 | — | — |
| 16 | 540.384 | 4.55 | 1.69680 | 55.5 |
| 17 | −80.606 | 0.20 | — | — |
| 18 | 90.812 | 6.80 | 1.51633 | 64.1 |
| 19 | −71.066 | 1.70 | 1.80518 | 25.4 |
| 20 | −537.668 | 10.58–1.16–7.59 | — | — |
| 21 | 38.217 | 4.49 | 1.48749 | 70.2 |
| 22 | 78.070 | 0.10 | — | — |
| 23 | 31.234 | 4.45 | 1.49700 | 81.6 |
| 24 | 51.594 | 11.41 | — | — |
| 25 | 78.207 | 2.06 | 1.83481 | 42.7 |
| 26 | 24.950 | 19.58 | — | — |
| 27 | 44.116 | 5.84 | 1.54072 | 47.2 |
| 28 | −86.632 | 12.92 | — | — |
| 29 | −43.584 | 1.50 | 1.80610 | 33.3 |
| 30 | −96.244 | — | — | — |

Third Embodiment

FIG. 13 shows a lens arrangement of a zoom lens system according to a third embodiment of the present invention.

Numerical data of the zoom lens system shown in FIG. 13 is shown in Table 3 below. Diagrams of various aberrations thereof for the infinity focus position at the wide-angle extremity, an intermediate focal length, and the telephoto extremity are shown in FIGS. 14a–14e, 15a–15e and 16a–15e, respectively. Diagrams of various aberrations thereof at an object distance of 1.5 m at the wide-angle extremity and the telephoto extremity are shown in FIGS. 17a–17e and 18a–18e, respectively.

TABLE 3

$F_{NO} = 1:2.8$
f = 81.63–135.00–195.00
ω = 15.2–9.0–6.2
$f_s$ = 43.50–43.50–43.50

| Surface No. | r | d | $N_d$ | $v_d$ |
|---|---|---|---|---|
| 1 | 136.121 | 4.64 | 1.51633 | 64.1 |
| 2 | 214.593 | 0.20 | — | — |
| 3 | 154.153 | 3.40 | 1.80518 | 25.4 |
| 4 | 91.146 | 16.76 | — | — |
| 5 | 101.220 | 12.45 | 1.43875 | 95.0 |
| 6 | −462.517 | 0.10 | — | — |
| 7 | 91.133 | 10.86 | 1.49700 | 81.6 |
| 8 | −4104.495 | 2.81–25.04–34.48 | — | — |
| 9 | 211.831 | 2.00 | 1.55963 | 61.2 |
| 10 | 54.634 | 5.93 | — | — |
| 11 | −152.097 | 2.00 | 1.77250 | 49.6 |
| 12 | 37.951 | 7.52 | 1.80518 | 25.4 |
| 13 | −2240.025 | 2.89 | — | — |
| 14 | −77.944 | 2.00 | 1.80400 | 46.6 |
| 15 | 336.807 | 39.00–21.26–2.50 | — | — |
| 16 | 757.741 | 4.31 | 1.69680 | 55.5 |
| 17 | −94.215 | 0.20 | — | — |
| 18 | 101.611 | 6.28 | 1.51633 | 64.1 |
| 19 | −87.332 | 2.00 | 1.80518 | 25.4 |
| 20 | −676.414 | 6.50–2.01–11.33 | — | — |
| 21 | 35.754 | 6.43 | 1.48749 | 70.2 |
| 22 | 179.890 | 0.10 | — | — |
| 23 | 27.141 | 6.05 | 1.49700 | 81.6 |
| 24 | 67.943 | 5.26 | — | — |
| 25 | 96.959 | 2.06 | 1.83481 | 42.7 |
| 26 | 22.116 | 23.31 | — | — |
| 27 | −233.889 | 4.07 | 1.54072 | 47.2 |
| 28 | −36.129 | 5.10 | — | — |
| 29 | −26.444 | 1.50 | 1.69680 | 55.5 |
| 30 | −96.667 | 0.10 | — | — |
| 31 | 52.770 | 4.16 | 1.58913 | 61.2 |
| 32 | 1921.537 | — | — | — |

Fourth Embodiment

FIG. 19 shows a lens arrangement of a loom lens system according to a fourth embodiment of the present invention.

Numerical data of the zoom lens system shown in FIG. 19 is shown in Table 4 below. Diagrams of various aberrations thereof for the infinity focus position at the wide-angle extremity, an intermediate focal length, and the telephoto extremity are shown in FIGS. 20a–20e, 21a–21e and 22a–22e, respectively. Diagrams of various aberrations thereof at an object distance of 1.5 m at the wide-angle extremity and the telephoto extremity are shown in FIGS. 23a–23a and 24a–24e, respectively.

TABLE 4

$F_{NO} = 1:2.8$
f = 81.63–135.00–195.00
ω = 15.2–9.0–6.2
$f_s$ = 48.50–48.50–48.50

| Surface No. | r | d | $N_d$ | $v_d$ |
|---|---|---|---|---|
| 1 | 114.635 | 4.85 | 1.51633 | 64.1 |
| 2 | 189.499 | 0.20 | — | — |
| 3 | 137.171 | 3.40 | 1.80518 | 25.4 |
| 4 | 83.512 | 15.86 | — | — |
| 5 | 94.213 | 10.73 | 1.43875 | 95.0 |
| 6 | −510.491 | 0.10 | — | — |
| 7 | 89.767 | 9.13 | 1.49700 | 81.6 |
| 8 | 39768.469 | 2.81–25.07–34.35 | — | — |

TABLE 4-continued $F_{NO} = 1:2.8$
f = 81.63–135.00–195.00
ω = 15.2–9.0–6.2
$f_s$ = 48.50–48.50–48.50

| Surface No. | r | d | $N_d$ | $v_d$ |
|---|---|---|---|---|
| 9 | 259.376 | 2.00 | 1.55963 | 61.2 |
| 10 | 51.648 | 5.39 | — | — |
| 11 | −156.469 | 2.00 | 1.77250 | 49.6 |
| 12 | 35.008 | 8.15 | 1.80518 | 25.4 |
| 13 | 5410.398 | 2.80 | — | — |
| 14 | −71.880 | 2.00 | 1.80400 | 46.6 |
| 15 | 349.621 | 33.83–18.69–2.50 | — | — |
| 16 | 5929.261 | 4.53 | 1.69680 | 55.5 |
| 17 | −78.971 | 0.20 | — | — |
| 18 | 82.137 | 6.88 | 1.51633 | 64.1 |
| 19 | −82.137 | 2.00 | 1.80518 | 25.4 |
| 20 | −855.134 | 8.43–1.31–8.22 | — | — |
| 21 | 53.074 | 4.19 | 1.48749 | 70.2 |
| 22 | 147.839 | 0.10 | — | — |
| 23 | 29.898 | 6.96 | 1.49700 | 81.6 |
| 24 | 124.548 | 10.77 | — | — |
| 25 | 201.633 | 2.06 | 1.83481 | 42.7 |
| 26 | 23.571 | 12.05 | — | — |
| 27 | −69.666 | 2.64 | 1.54072 | 47.2 |
| 28 | −39.948 | 14.01 | — | — |
| 29 | −35.518 | 2.00 | 1.69680 | 55.5 |
| 30 | −49.782 | 0.10 | — | — |
| 31 | 54.675 | 4.82 | 1.58913 | 61.2 |
| 32 | −1330.563 | — | — | — |

Fifth Embodiment

FIG. 25 shows a lens arrangement of a zoom lens system according to a fifth embodiment of the present invention.

Numerical data of the zoom lens system shown in FIG. 25 shown in Table 5 below. Diagrams of various aberrations thereof for the infinity focus position at the wide-angle extremity, an intermediate focal length, and the telephoto extremity are shown in FIGS. 26a–26e, 27a–27e and 28a–28e, respectively. Diagrams of various aberrations thereof at an object distance of 1.5 m at the wide-angle extremity and the telephoto extremity are shown in FIGS. 29a–29e and 30a–29 e, respectively.

TABLE 5

$F_{NO} = 1:2.8$
f = 81.62–135.00–195.00
ω = 15.2–9.0–6.2
$f_s$ = 48.62–48.62–48.62

| Surface No. | r | d | $N_d$ | $v_d$ |
|---|---|---|---|---|
| 1 | 108.664 | 5.11 | 1.69680 | 55.5 |
| 2 | 186.977 | 0.20 | — | — |
| 3 | 142.500 | 3.00 | 1.80518 | 25.4 |
| 4 | 79.717 | 15.03 | — | — |
| 5 | 90.458 | 10.27 | 1.49700 | 81.6 |
| 6 | −800.000 | 0.20 | — | — |
| 7 | 93.500 | 8.38 | 1.49700 | 81.6 |
| 8 | 1751.974 | 2.82–24.99–33.63 | — | — |
| 9 | 1123.680 | 1.80 | 1.60311 | 60.7 |
| 10 | 43.300 | 6.78 | — | — |
| 11 | −83.290 | 1.80 | 1.69680 | 55.5 |
| 12 | 45.570 | 7.62 | 1.80518 | 25.4 |
| 13 | −238.573 | 2.06 | — | — |
| 14 | −73.562 | 1.80 | 1.80610 | 40.9 |
| 15 | ∞ | 33.10–18.34–2.50 | — | — |
| 16 | 1500.000 | 4.58 | 1.69680 | 55.5 |
| 17 | −79.199 | 0.10 | — | — |
| 18 | 74.215 | 7.85 | 1.48749 | 70.2 |
| 19 | −74.215 | 2.00 | 1.76182 | 26.5 |
| 20 | −512.000 | 8.84–1.43–8.63 | — | — |
| 21 | 45.470 | 5.10 | 1.49700 | 81.6 |

TABLE 5-continued $F_{NO} = 1:2.8$
$f = 81.62–135.00–195.00$
$\omega = 15.2–9.0–6.2$
$f_s = 48.62–48.62–48.62$

| Surface No. | r | d | $N_d$ | $v_d$ |
| --- | --- | --- | --- | --- |
| 22 | 156.000 | 0.10 | — | — |
| 23 | 34.619 | 5.65 | 1.48749 | 70.2 |
| 24 | 70.000 | 3.00 | 1.64250 | 58.4 |
| 25 | 44.700 | 11.38 | — | — |
| 26 | 53.554 | 2.00 | 1.83481 | 42.7 |
| 27 | 23.860 | 28.90 | — | — |
| 28 | 48.000 | 5.40 | 1.48749 | 70.2 |
| 29 | 737.998 | — | — | — |

The values of $f_1$, $f_{1-1}$, and $f_1/f_{1-1}$ in the five embodiments are shown in Table 6 below.

TABLE 6

|  | $f_1$ | $f_{1-1}$ | $f_1/f_{1-1}$ |
| --- | --- | --- | --- |
| Embodiment 1 | 104.57 | −849.26 | −0.123 |
| Embodiment 2 | 114.72 | −505.59 | −0.227 |
| Embodiment 3 | 113.87 | −489.40 | −0.233 |
| Embodiment 4 | 109.54 | −568.48 | −0.193 |
| Embodiment 5 | 106.27 | −682.73 | −0.156 |

As can be seen from Table 6 above, the value of $f_1/f_{1-1}$ in the five embodiments satisfies the requirements defined by formula (2). The Abbe numbers of the two positive lenses of the second sub group are both larger than 80 as shown underlined in the tables, and accordingly, satisfy the requirement defined by the formula (1). Moreover, in the telephoto zoom lens according to the present invention, the aberrations are effectively corrected for the infinity focus position and the close object distance (1.5 m) at the wide angle extremity, the intermediate focal length, and the telephoto extremity, respectively.

As may be seen from the foregoing, according to the present invention, an inner focus type telephoto zoom lens system exhibits a good optical performance throughout the zoom range, so that a telephoto zoom lens of high aperture ratio having a high image forming capability can be obtained regardless of the object distance.

I claim:

1. An inner focus type telephoto zoom lens comprising:

a first lens group having a positive power; and a rear lens group of a variable power having a plurality of lens groups, located in this order from an object side;

said first lens group comprising:

a first sub-group that is not moved upon focusing, and a second sub-group comprising a plurality of movable positive lenses that are moved along an optical axis to provide said focusing, said first sub-group and said second sub-group being located in this order from the object side, wherein said second sub-group satisfies the following relationship:

$v_{1-2} > 75$ wherein $v_{1-2}$ represents a mean value of the Abbe of all the lenses that constitute said second sub-group.

2. An inner focus type telephoto zoom lens according to claim 1, wherein said second sub-group is comprised of two positive lenses whose Abbe numbers are larger than 75.

3. An inner focus type telephoto zoom lens according to claim 1, wherein said plurality of positive lenses of said second sub-group are provided with a convex surface located on the object side.

4. An inner focus type telephoto zoom lens according to claim 1, wherein said first sub-group satisfies the following relationship:

$−0.3 < f_1/f_{1-1} < 0$ wherein $f_{1-1}$ represents a focal length of said first sub-group; and $f_1$ represents a focal length of said first lens group at an infinity focus position.

5. An inner focus type telephoto zoom lens according to claim 4, wherein said first sub-group includes at least one positive lens, and all positive lenses of said first sub-group have an Abbe number larger than 75.

6. An inner focus type telephoto zoom lens comprising:

a first lens group having a positive power, said first lens group comprising a first sub-group that is not moved upon focusing, said first sub-group comprising one positive lens and one negative meniscus lens whose concave surface is located on an image side, arranged in this order from the object side and a second sub-group comprising a plurality of movable positive lenses that are moved along an optical axis of the zoom lens to provide said focusing, said first sub-group and said second sub-groups being located in this order from the object side; and a rear lens group of variable power having a plurality of lens groups, located in this order from an object side.

7. The inner focus type telephoto lens according to claim 6, wherein each of said plurality of positive lenses of said second sub-group are provided with a convex surface located on the object side.

8. The inner focus type telephoto lens according to claim 6, wherein said first sub-group satisfies the following relationship:

$−0.3 < f_1/f_{1-1} < 0$ wherein $f_{1-1}$ represents a focal length of said first sub-group at an infinity focus position; and $f_1$ represents a focal length of said first lens group at the infinity focus position.

9. The inner focus type telephoto zoom lens according to claim 8, wherein said first sub-group includes at least one positive lens, and wherein all positive lenses of said first sub-group have an Abbe number larger than 75.

10. The inner focus type telephoto zoom lens according to claim 6, said first sub-group having a negative power.

11. An inner focus type telephoto zoom lens comprising:

a first lens group have a positive power, said first lens group comprising a first sub-group that is not moved upon focusing, and a second sub-group comprising a plurality of movable positive lenses that are moved along an optical axis to provide said focusing, said first sub-group and said second sub-group being located in this order from an object side; and a rear lens group of a variable power have a plurality of lens groups, located in this order from an object side, said rear lens group comprising a negative variator lens group, a positive compensator lens group and a positive relay lens group, so that said inner focus type telephoto zoom lens comprises four lens groups.

12. The inner focus type telephoto zoom lens according to claim 11, wherein each of said plurality of positive lenses of said second sub-group are provided with a convex surface located on the object side.

13. The inner focus type telephoto zoom lens according to claim 11, wherein said first sub-group satisfies the following relationship:

$$-0.3 < f_1/f_{1-1} < 0$$

wherein $f_{1-1}$ represents a focal length of said first sub-group at an infinity focus position and $f_1$ represents a focal length of said first lens group at the infinity focus position.

14. The inner focus type telephoto zoom lens according to claim 13, wherein said first sub-group includes at least one positive lens and wherein all positive lenses of said first sub-group have an Abbe number larger than 75.

* * * * *